US012742386B2

(12) United States Patent
Reding et al.

(10) Patent No.: US 12,742,386 B2
(45) Date of Patent: Sep. 22, 2026

(54) METHOD AND APPARATUS FOR DOWNHOLE FLUID MICROSAMPLE COLLECTION WITH STAGED HYDRAULIC ACTUATION

(71) Applicant: Halliburton Energy Services, Inc., Houston, TX (US)

(72) Inventors: Christian Reding, Houston, TX (US); James Cernosek, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 19/221,203

(22) Filed: May 28, 2025

(65) Prior Publication Data

US 2025/0290411 A1 Sep. 18, 2025

Related U.S. Application Data

(63) Continuation of application No. 18/540,728, filed on Dec. 14, 2023, now Pat. No. 12,338,733.

(51) Int. Cl.

| | |
|---|---|
| ***E21B 49/08*** | (2006.01) |
| ***E21B 34/06*** | (2006.01) |
| ***F15B 1/04*** | (2006.01) |
| ***F15B 13/02*** | (2006.01) |

(52) U.S. Cl.

CPC .......... *E21B 49/081* (2013.01); *E21B 34/066* (2013.01); *F15B 1/04* (2013.01); *F15B 13/024* (2013.01)

(58) Field of Classification Search

CPC .... E21B 49/081; E21B 49/085; E21B 49/086; G01N 1/02; G01N 1/10

See application file for complete search history.

(56) References Cited

U.S. PATENT DOCUMENTS

| | | | | |
|---|---|---|---|---|
| 3,826,133 A | | 7/1974 | Nicolas et al. | |
| 3,934,468 A | | 1/1976 | Brieger | |
| 4,454,773 A | * | 6/1984 | Brunner | G01N 1/10<br>73/863.31 |
| 4,940,088 A | | 7/1990 | Goldschild | |
| 6,357,306 B1 | | 3/2002 | Jaeger | |
| 6,435,279 B1 | | 8/2002 | Howe et al. | |
| 7,775,276 B2 | | 8/2010 | Pelletier et al. | |

(Continued)

OTHER PUBLICATIONS

International Search Report and Written Opinion for International Patent Application No. PCT/US2023/086537 dated Sep. 10, 2024. PDF file. 7 pages.

(Continued)

*Primary Examiner* — Kenneth L Thompson

(74) *Attorney, Agent, or Firm* — John Wustenberg; C. Tumey Law Group PLLC

(57) ABSTRACT

Disclosed herein are methods and systems for capturing a large collection of downhole fluid samples and, more particularly, disclosed are methods and systems for using at least two hydraulic pressure lines to alternatingly actuate hydraulic valves disposed in an interlinked series to obtain any large collection of hydraulically actuated components to be energized in sequence. A large collection of downhole fluid samples may be defined as any number of downhole fluid samples wherein the number of downhole fluid samples is larger than the number of actuators.

17 Claims, 14 Drawing Sheets

(56) References Cited

U.S. PATENT DOCUMENTS

| | | | | |
|---|---|---|---|---|
| 7,845,405 | B2 * | 12/2010 | Villareal | E21B 49/083 166/264 |
| 8,245,781 | B2 | 8/2012 | Ciglenec et al. | |
| 8,967,242 | B2 | 3/2015 | Evans, II et al. | |
| 9,115,567 | B2 | 8/2015 | Hsu et al. | |
| 9,187,999 | B2 * | 11/2015 | Galvan-Sanchez | E21B 49/082 |
| 9,316,083 | B2 * | 4/2016 | Vasques | E21B 49/081 |
| 9,528,874 | B2 | 12/2016 | Larter et al. | |
| 11,352,881 | B2 | 6/2022 | Pelletier et al. | |
| 12,338,733 | B1 * | 6/2025 | Reding | E21B 49/081 |
| 2008/0093078 | A1 | 4/2008 | Vasques et al. | |
| 2014/0151038 | A1 | 6/2014 | Galvan-Sanchez et al. | |
| 2015/0226060 | A1 | 8/2015 | Jones et al. | |
| 2020/0141234 | A1 * | 5/2020 | Ventre | E21B 49/083 |
| 2021/0054737 | A1 | 2/2021 | Dai et al. | |
| 2022/0389813 | A1 | 12/2022 | Pelletier et al. | |
| 2023/0112340 | A1 | 4/2023 | Mahavadi et al. | |

OTHER PUBLICATIONS

Notice of Allowance for U.S. Appl. No. 19/222,598 dated Jun. 16, 2026. PDF file. 11 pages.

Non-Final Office Action for U.S. Appl. No. 19/222,598 dated Mar. 2, 2026. PDF file. 10 pages.

* cited by examiner

METHOD AND APPARATUS FOR DOWNHOLE FLUID MICROSAMPLE COLLECTION WITH STAGED HYDRAULIC ACTUATION

CROSS REFERENCE TO RELATED APPLICATIONS

This is a Continuation Application of U.S. application Ser. No. 18/540,728, filed Dec. 14, 2023, the entire disclosure of which is incorporated herein by reference.

BACKGROUND

During oil and gas exploration, many types of information may be collected and analyzed. The information may be used to determine the quantity and quality of hydrocarbons in a reservoir and to develop or modify strategies for hydrocarbon production. For instance, the information may be used for reservoir evaluation, flow assurance, reservoir stimulation, facility enhancement, production enhancement strategies, and reserve estimation. One technique for collecting relevant information involves obtaining and analyzing fluid samples from a reservoir of interest. There are a variety of different tools that may be used to obtain the fluid sample. A downhole fluid and sampling tool can be used to acquire at least one downhole fluid sample, for example. The downhole fluid sample may then be analyzed in a laboratory to determine fluid properties.

When several downhole fluid samples are desired, electrically or hydraulically actuated valves are required to provide isolation of each fluid sample in a vessel. An electrically or hydraulically actuated valve is dedicated to each fluid sample vessel. However, when large quantities of downhole samples are needed, the number of electrically or hydraulically actuated valves the downhole fluid and sampling tool can handle becomes a limiting factor.

BRIEF DESCRIPTION OF THE DRAWINGS

These drawings illustrate certain aspects of some of the embodiments of the present disclosure, and should not be used to limit or define the disclosure.

DETAILED DESCRIPTION

Figure 1:
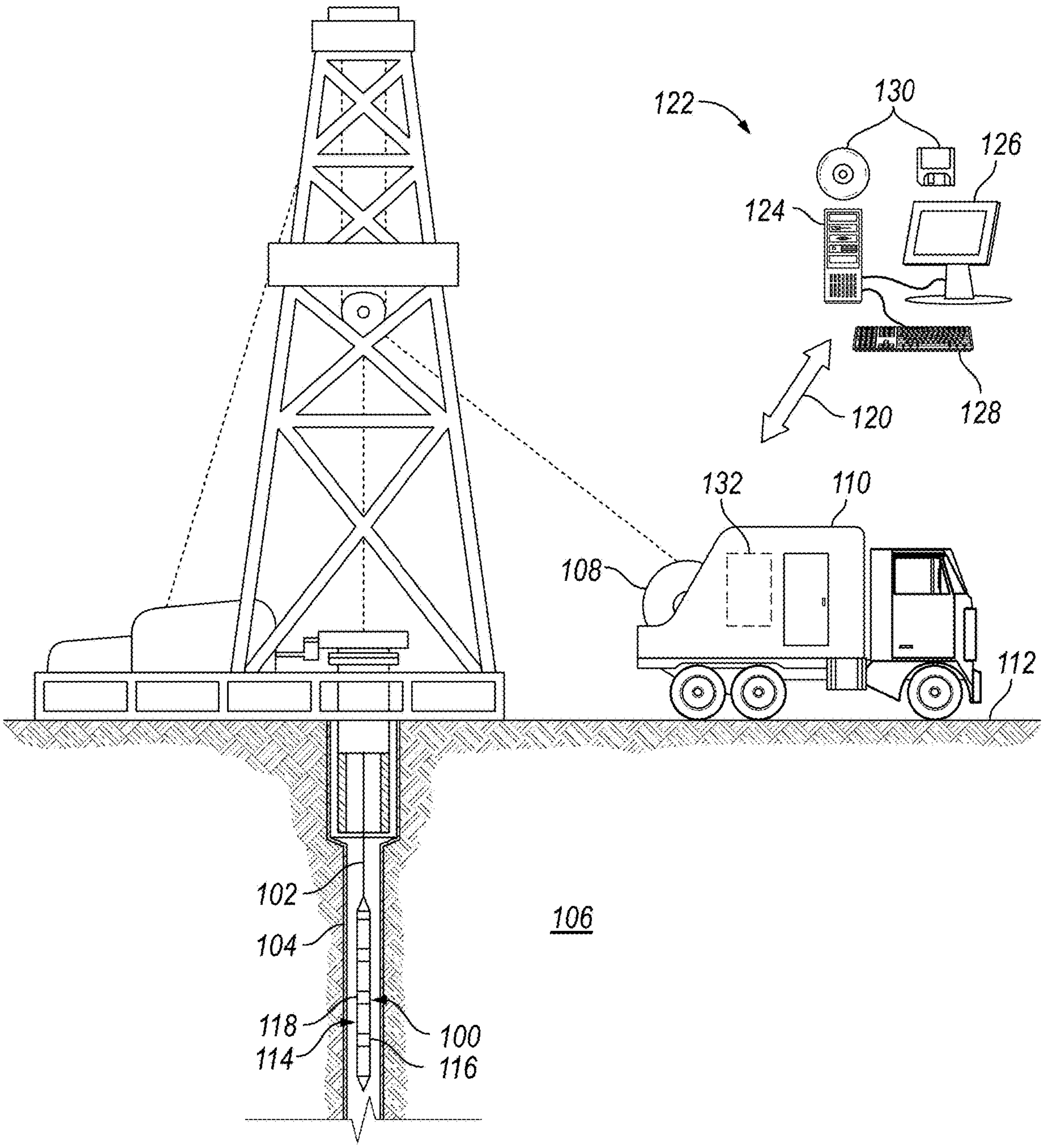
FIG. 1 illustrates a schematic view of a well in which an example embodiment of a fluid sample system is deployed.

Disclosed herein are methods and systems for capturing a large collection of downhole fluid samples and, more particularly, disclosed are methods and systems for using at least two hydraulic pressure lines to alternatingly actuate hydraulic valves disposed in an interlinked series to obtain any large collection of hydraulically actuated components to be energized in sequence. A large collection of downhole fluid samples may be defined as any number of downhole fluid samples wherein the number of downhole fluid samples is larger than the number of actuators. The volume of the downhole fluid sample can be from about 0.1 mL to about 500 mL, or anything in between, or from about 0.1 mL to about 100 mL, or from about 0.5 mL to about 75 mL, or from about 1 mL to about 50 mL, or from about 2.5 mL to about 25 mL, or from about 5 mL to about 20 mL, or from about 10 mL to about 15 mL, or from about 1 mL to about 10 mL, or from about 1 mL to about 5 mL, for example. In embodiments, hydraulic pressure is created by an electric motor-driven hydraulic pump. It is then communicated via solenoid valves to designated lines. An algorithm then elevates and relieves pressure on the primary bus, then elevates and relieves pressure on the secondary bus, then repeats itself until all valves have received power. The sample containing vessel itself is a rod with annular cutout in which the fluid may be isolated when positioned into a bore that also serves as a cartridge for handling on the surface. This allows a small set of directly controlled actuators to indirectly actuate any arbitrarily larger set of valves, and therefore, to isolate a larger set of downhole fluid sample vessels without any additional electrical support, motors, or solenoids, but only one additional passive hydraulically actuated valve and vessel. This makes large scale downhole sample collection, such as 10 downhole fluid samples or more, or 12 downhole fluid samples or more, or 13 downhole fluid samples or more, technically possible, and financially viable.

Downhole sampling of a reservoir fluid may be performed to carry out certain embodiments of the present disclosure. Downhole fluid sampling refers to a type of downhole operation, which may be used for formation evaluation, asset decisions, and operational decisions. In general, a downhole fluid sampling tool is utilized for analyzing the fluids from a formation and their composition. As disclosed herein, a property of a fluid refers to a chemical property, phase property, i.e., fluid (liquid aqueous, liquid organic, or gas), or solid phase in concentration or identification, or phase behavior. Examples of properties may include, compositional component concentrations, such as methane, ethane, propane, butane, and pentane; organic liquid components, such as a hexane plus (C6+) fraction or hydrocarbon components therein, saturates fraction, aromatics fraction, resins fraction, asphaltenes fraction; total acid number; pH, eH (activity of electrons), water composition, including cations such as sodium, potassium, calcium, magnesium and trace cations, anions such as chloride, bromide, sulfide, sulfate, carbonate, bicarbonate, other dissolved solids; organic acids and/or their conjugates; and other inorganic components such as carbon dioxide, hydrogen sulfide, nitrogen or water. Physical properties may include compressibility, density, thermal conductivity, heat capacity, viscosity;

phase behavior including bubble point, gas to oil ratio, phase envelope for gas-liquid or solid-liquid, including asphaltenes or waxes; and compositional grading with depth. Properties may also include the interpretation of similarity or differences between different sets of fluids such as that reflected by reservoir or field architecture, and reservoir compartmentalization. Properties may be used therein to obtain reservoir or field architecture or reservoir compartmentalization, compositional grading, and may be used to interpreted processes leading to various compositional grading or other equilibrium or disequilibrium distributions of fluids and fluid properties. Properties may therefore refer to the measured, calculated, and inferred properties obtained from sensor measurements and the properties derived from other therein such as but not limited to that by interpretation, such as equation of state interpretation.

In some embodiments, it should be noted that only limited sensors such as downhole optical spectroscopy, Nuclear Magnetic Resonance spectroscopy (NMR), density, dielectric spectroscopy, and resistivity for example, may be used to determine the purity of the reservoir fluid being pumped inside the downhole fluid sampling and analysis tool. Initially, as reservoir fluid is sucked into the downhole fluid sampling tool, it is contaminated with drilling fluid filtrate resulting from drilling operation. As more and more reservoir fluid is being pumped into the downhole fluid sampling tool, the drilling fluid filtrate contamination decreases and the reservoir fluid inside the downhole fluid sampling tool or passageway is getting cleaner and more representative of the native reservoir fluid. Downhole optical spectroscopy can be critical in determining the amount of drilling fluid filtrate contamination and therefore if the reservoir fluid inside the tool is representative of the native reservoir fluid without drilling-induced contamination.

For example, the reservoir fluid's chemical behavior may include, but may not be limited to, a petroleum composition comprising saturates, aromatics, resins, asphaltenes fractions, methane, ethane, propane, butane, pentane, hexane and higher components and individual or lumped higher hydrocarbon components (where lumping may be the composite analysis or reporting of two or more hydrocarbon components), inorganic component composition, including water, nitrogen, carbon dioxide, and hydrogen sulfide chemical potential, including, but not limited to, reactive capability acidic levels of individual components, i.e., organic acids, or as a whole, i.e., pH or Total Acid Number (TAN), or for instance redox potential. These chemical properties may be directly probed optically, by optical analysis in combination with other measurement devices, which may include, but may not be limited to, density, bubble point, compressibility, acoustic, NMR, capacitance, dielectric spectroscopy, nuclear methods, x-ray methods, terahertz methods, and resistivity.

Alternatively, chemical properties may be interpreted based on physical, chemical, or empirical models as a secondary interpretation based on the directly probed chemical properties, which may include, but may not be limited, to the listed methods. For example, physical properties may include, but may not be limited to, bubble point, compressibility, phase envelope, density, and viscosity, and may be measured directly by devices such as density sensors, viscometers, phase behavior experimentation, trapped volume devices, fractionation devices such as valved devices or membrane devices or derived by physical, chemical, or empirical models as a secondary interpretation based on directly probed physical properties. Physical properties may be measured or derived based, in part, on multiple measurements. As a non-limiting example for instance, phase behavior (or other physical properties), like compressibility or bubble point may be derived based on combinations of physical measurements and compositions as modeled by an equation of state (EOS) such as, but not limited to, Peng Robertson or Soave-Redlich-Kwong (SRK) cubic equation of state, a viral equation of state, or a PC-SAFT equation of state or an empirical machine learning model such as, but not limited to a neural network or a random forest model or a gradient boost method. Subsurface formation comprises several reservoirs. Therefore, the ability to capture a large number of representative downhole reservoir fluids may be critical in characterizing a formation properly.

FIG. 1 is a schematic diagram of downhole fluid sampling tool 100 on a conveyance 102. As illustrated, wellbore 104 may extend through subterranean formation 106. In examples, reservoir fluid may be contaminated with well fluid (e.g., drilling fluid) from wellbore 104. As described herein, the fluid sample may be analyzed to determine fluid contamination and other fluid properties of the reservoir fluid. As illustrated, a wellbore 104 may extend through subterranean formation 106. While the wellbore 104 is shown extending generally vertically into the subterranean formation 106, the principles described herein are also applicable to wellbores that extend at an angle through the subterranean formation 106, such as horizontal and slanted wellbores, for example. Although FIG. 1 shows a vertical or low inclination angle well, high inclination angle or horizontal placement of the well and equipment is also possible. It should further be noted that while FIG. 1 generally depicts a land-based operation, those skilled in the art will readily recognize that the principles described herein are equally applicable to subsea operations that employ floating or sea-based platforms and rigs, without departing from the scope of the disclosure.

As illustrated, a hoist 108 may be used to run downhole fluid sampling tool 100 into wellbore 104. Hoist 108 may be disposed on vehicle 110. Hoist 108 may be used, for example, to raise and lower conveyance 102 in wellbore 104. While hoist 108 is shown on vehicle 110, it should be understood that conveyance 102 may alternatively be disposed from a hoist 108 that is installed at surface 112 instead of being located on vehicle 110. Downhole fluid sampling tool 100 may be suspended in wellbore 104 on conveyance 102. Other conveyance types may be used for conveying downhole fluid sampling tool 100 into wellbore 104, including coiled tubing and wired drill pipe, for example. Downhole fluid sampling tool 100 may comprise a tool body 114, which may be elongated as shown on FIG. 1. Tool body 114 may be any suitable material, including without limitation titanium, stainless steel, alloys, plastic, combinations thereof, and the like. Downhole fluid sampling tool 100 may further comprise one or more sensors 116 for measuring properties of the fluid sample, reservoir fluid, wellbore 104, subterranean formation 106, or the like. In examples, downhole fluid sampling tool 100 may also comprise a fluid analysis module 118, which may be operable to process information regarding fluid sample, as described below. The downhole fluid sampling tool 100 may be used to collect fluid samples from subterranean formation 106 and may obtain and separately store different fluid samples from subterranean formation 106.

In examples, fluid analysis module 118 may comprise at least one sensor that may continuously monitor a fluid such as a reservoir fluid, formation fluid, wellbore fluid, or formation nonnative fluids such as drilling fluid filtrate.

Such monitoring may take place in a fluid flow line or a formation tester probe such as a pad or packer or may be able to make measurements investigating the formation including measurements into the formation. Such sensors comprise optical sensors, acoustic sensors, electromagnetic sensors, conductivity sensors, resistivity sensors, selective electrodes, density sensors, mass sensors, thermal sensors, chromatography sensors, viscosity sensors, bubble point sensors, fluid compressibility sensors, flow rate sensors, pressure sensors, nuclear magnetic resonance (NMR) sensors. Sensors may measure a contrast between drilling fluid filtrate properties and formation fluid properties. Fluid analysis module 118 may be operable to derive properties and characterize the fluid sample. By way of example, fluid analysis module 118 may measure absorption, transmittance, or reflectance spectra and translate such measurements into component concentrations of the fluid sample, which may be lumped component concentrations, as described above. The fluid analysis module 118 may also measure gas-to-oil ratio, fluid composition, water cut, live fluid density, live fluid viscosity, formation pressure, and formation temperature and fluid composition. Fluid analysis module 118 may also be operable to determine fluid contamination of the fluid sample and may comprise any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. The absorption, transmittance, or reflectance spectra absorption, transmittance, or reflectance spectra may be measured with sensors 116 by way of standard operations. For example, fluid analysis module 118 may comprise random access memory (RAM), one or more processing units, such as a central processing unit (CPU), or hardware or software control logic, ROM, and/or other types of nonvolatile memory. Fluid analysis module 118 and fluid sampling tool 100 may be communicatively coupled via communication link 120 with information handling system 122.

Any suitable technique may be used for transmitting signals from the downhole fluid sampling tool 100 to the surface 112. As illustrated, a communication link 120 (which may be wired or wireless, for example) may be provided that may transmit data from downhole fluid sampling tool 100 to an information handling system 122 at surface 112. Information handling system 122 may comprise a processing unit 124, a monitor 126, an input device 128 (e.g., keyboard, mouse, etc.), and/or computer media 130 (e.g., optical disks, magnetic disks) that can store code representative of the methods described herein. Information handling system 122 may act as a data acquisition system and possibly a data processing system that analyzes information from downhole fluid sampling tool 100. For example, information handling system 122 may process the information from downhole fluid sampling tool 100 for determination of fluid contamination. The information handling system 122 may also determine additional properties of the fluid sample (or reservoir fluid), such as component concentrations, pressure-volume-temperature properties (e.g., bubble point, phase envelop prediction, etc.) based on the fluid characterization. This processing may occur at surface 112 in real-time. Alternatively, the processing may occur downhole or at surface 112 or another location after recovery of downhole fluid sampling tool 100 from wellbore 104. Alternatively, the processing may be performed by an information handling system in wellbore 104, such as fluid analysis module 118. The resultant fluid contamination and fluid properties may then be transmitted to surface 112, for example, in real-time.

Figure 2:
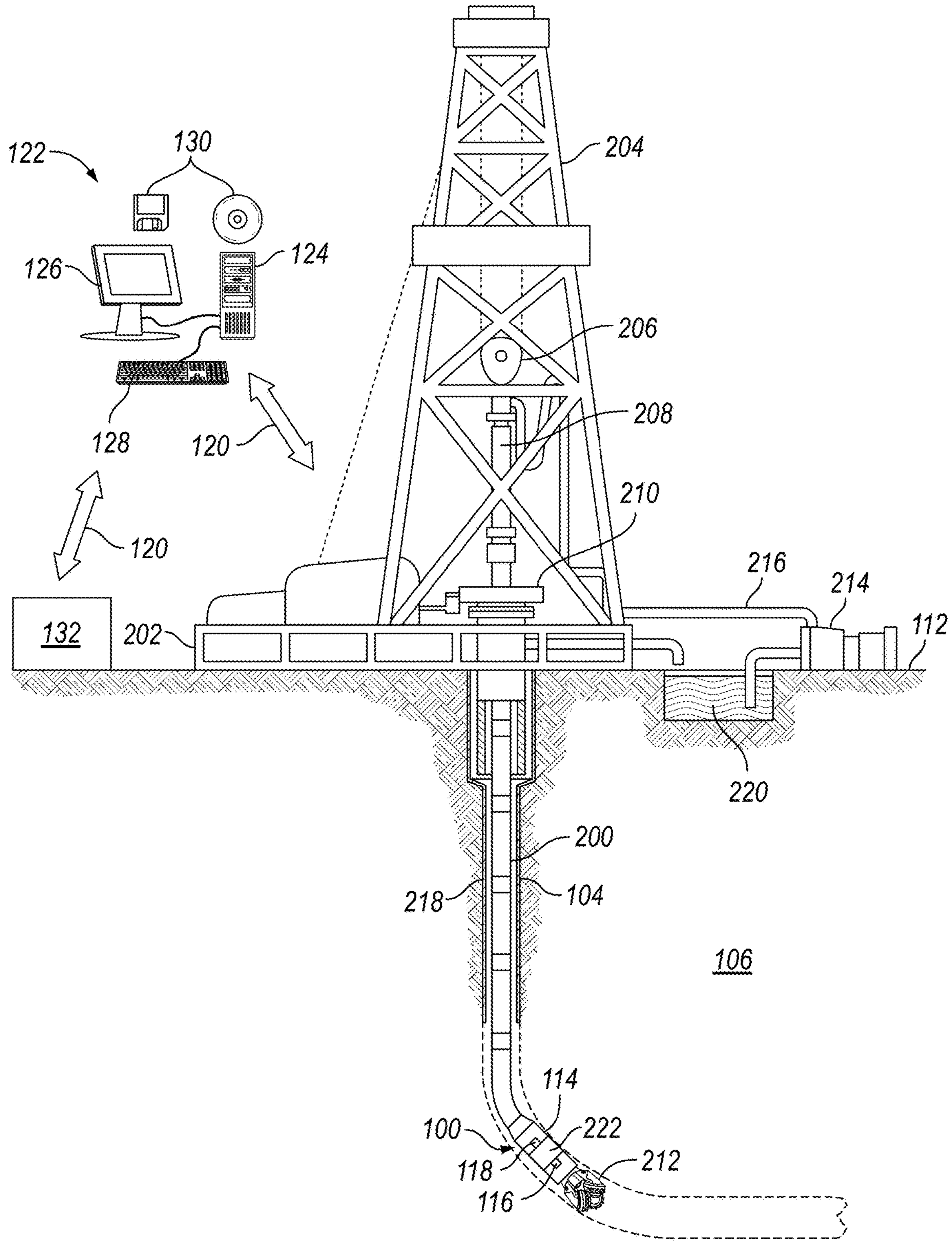
FIG. 2 illustrates a schematic view of another well in which an example embodiment of a fluid sample system is deployed.

FIG. 2 is a schematic diagram of downhole fluid sampling tool 100 disposed on a drill string 200 in a drilling operation. Downhole fluid sampling tool 100 may be used to obtain a fluid sample, for example, a fluid sample of a reservoir fluid from subterranean formation 106. The reservoir fluid may be contaminated with well fluid (e.g., drilling fluid) from wellbore 104. As described herein, the fluid sample may be analyzed to determine fluid contamination and other fluid properties of the reservoir fluid. As illustrated, a wellbore 104 may extend through subterranean formation 106. While the wellbore 104 is shown extending generally vertically into the subterranean formation 106, the principles described herein are also applicable to wellbores that extend at an angle through the subterranean formation 106, such as horizontal and slanted wellbores. For example, although FIG. 2 shows a vertical or low inclination angle well, high inclination angle or horizontal placement of the well and equipment is also possible. It should further be noted that while FIG. 2 generally depicts a land-based operation, those skilled in the art will readily recognize that the principles described herein are equally applicable to subsea operations that employ floating or sea-based platforms and rigs, without departing from the scope of the disclosure.

As illustrated in FIG. 2, a drilling platform 202 may support a derrick 204 having a traveling block 206 for raising and lowering drill string 200. Drill string 200 may comprise, but is not limited to, drill pipe and coiled tubing, as generally known to those skilled in the art. A kelly 208 may support drill string 200 as it may be lowered through a rotary table 210. A drill bit 212 may be attached to the distal end of drill string 200 and may be driven either by a downhole motor and/or via rotation of drill string 200 from the surface 112. Without limitation, drill bit 212 may comprise roller cone bits, PDC bits, natural diamond bits, any hole openers, reamers, coring bits, and the like. As drill bit 212 rotates, it may create and extend wellbore 104 that penetrates various subterranean formations 106. A pump 214 may circulate drilling fluid through a feed pipe 216 to kelly 208, downhole through interior of drill string 200, through orifices in drill bit 212, back to surface 112 via annulus 218 surrounding drill string 200, and into a retention pit 220.

Drill bit 212 may be just one piece of a downhole assembly that may comprise one or more drill collars 222 and downhole fluid sampling tool 100. Downhole fluid sampling tool 100, which may be built into drill collars 222 may gather measurements and fluid samples as described herein. One or more of the drill collars 222 may form a tool body 114, which may be elongated as shown on FIG. 2. Tool body 114 may be any suitable material, including without limitation titanium, stainless steel, alloys, plastic, combinations thereof, and the like. Downhole fluid sampling tool 100 may be similar in configuration and operation to downhole fluid sampling tool 100 shown on FIG. 1 except that FIG. 2 shows downhole fluid sampling tool 100 disposed on drill string 200. Alternatively, the sampling tool may be lowered into the wellbore after drilling operations on a wireline.

Downhole fluid sampling tool 100 may further comprise one or more sensors 116 for measuring properties of the fluid sample reservoir fluid, wellbore 104, subterranean formation 106, or the like. The one or more sensors 116 may be disposed within fluid analysis module 118. In examples, more than one fluid analysis module may be disposed on drill string 200. The properties of the fluid are measured as the fluid passes from the formation through the tool and into either the wellbore or a sample container. As fluid is flushed in the near wellbore region by the mechanical pump, the fluid that passes through the tool generally reduces in drilling fluid filtrate content, and generally increases in formation fluid content. The downhole fluid sampling tool 100 may be used to collect a fluid sample from subterranean formation 106 when the drilling fluid filtrate content has been determined to be sufficiently low. Sufficiently low depends on the purpose of sampling. For some laboratory testing, below 10% drilling fluid contamination is sufficiently low, while for other laboratory testing, below 1% drilling fluid filtrate contamination is sufficiently low. Sufficiently low also depends on the nature of the formation fluid such that lower requirements are generally needed for lighter oil as designated with either a higher GOR or a higher API gravity. Sufficiently low also depends on the rate of cleanup in a cost benefit analysis since longer pump out times required to incrementally reduce the contamination levels may have prohibitively large costs. As previously described, the fluid sample may comprise a reservoir fluid, which may be contaminated with a drilling fluid or drilling fluid filtrate. Downhole fluid sampling tool 100 may obtain and separately store different fluid samples from subterranean formation 106 with fluid analysis module 118. Fluid analysis module 118 may operate and function in the same manner as described above. However, storing of the fluid samples in the downhole fluid sampling tool 100 may be based on the determination of the fluid contamination. For example, if the fluid contamination exceeds a tolerance, then the fluid sample may not be stored. If the fluid contamination is within a tolerance, then the fluid sample may be stored in the downhole fluid sampling tool 100. In examples, contamination may be defined within fluid analysis module 118.

As previously described, information from downhole fluid sampling tool 100 may be transmitted to an information handling system 122, which may be located at surface 112. As illustrated, communication link 120 (which may be wired or wireless, for example) may be provided that may transmit data from downhole fluid sampling tool 100 to an information handling system 122 at surface 112. Information handling system 122 may comprise a processing unit 124, a monitor 126, an input device 128 (e.g., keyboard, mouse, etc.), and/or computer media 130 (e.g., optical disks, magnetic disks) that may store code representative of the methods described herein. In addition to, or in place of processing at surface 112, processing may occur downhole (e.g., fluid analysis module 118). In examples, information handling system 122 may perform computations to estimate asphaltenes within a fluid sample.

Figure 3:
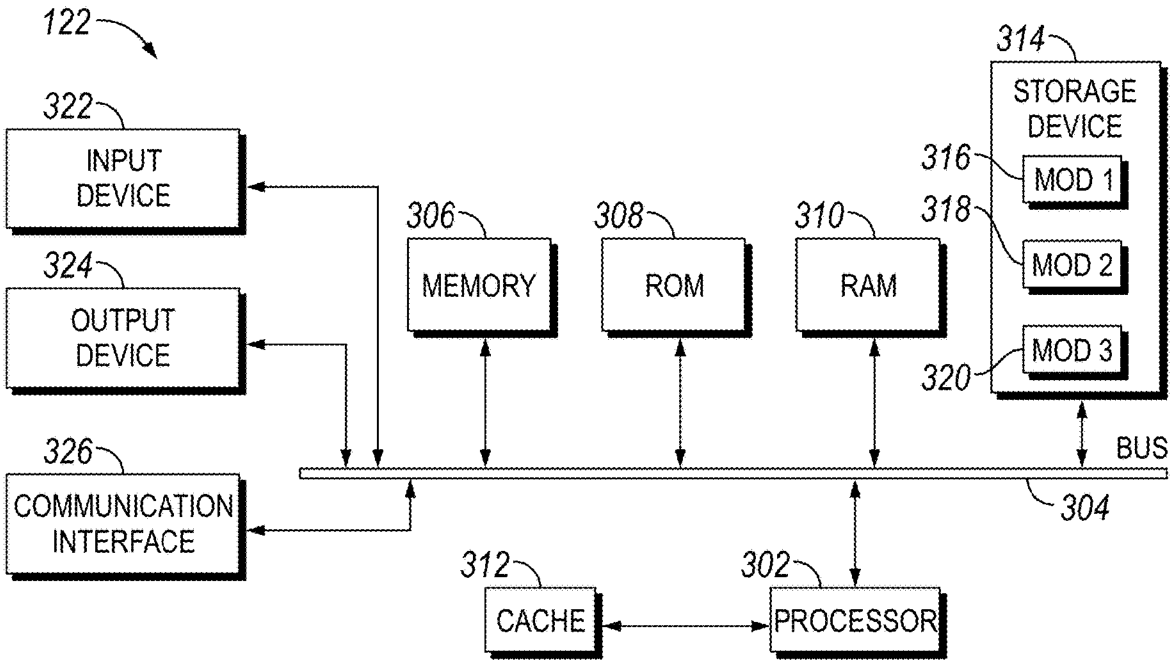
FIG. 3 illustrates a schematic view of a chipset in an information handling system.

FIG. 3 illustrates an example information handling system 122 which may be employed to perform various steps, methods, and techniques disclosed herein. Persons of ordinary skill in the art will readily appreciate that other system examples are possible. As illustrated, information handling system 122 comprises a processing unit (CPU or processor) 302 and a system bus 304 that couples various system components including system memory 306 such as read only memory (ROM) 308 and random-access memory (RAM) 310 to processor 302. Processors disclosed herein may all be forms of this processor 302. Information handling system 122 may comprise a cache 312 of high-speed memory connected directly with, in close proximity to, or integrated as part of processor 302. Information handling system 122 copies data from memory 306 and/or storage device 314 to cache 312 for quick access by processor 302. In this way, cache 312 provides a performance boost that avoids processor 302 delays while waiting for data. These and other modules may control or be configured to control processor 302 to perform various operations or actions. Other system memory 306 may be available for use as well. Memory 306 may comprise multiple different types of memory with different performance characteristics. It may be appreciated that the disclosure may operate on information handling system 122 with more than one processor 302 or on a group or cluster of computing devices networked together to provide greater processing capability. Processor 302 may comprise any general-purpose processor and a hardware module or software module, such as first module 316, second module 318, and third module 320 stored in storage device 314, configured to control processor 302 as well as a special-purpose processor where software instructions are incorporated into processor 302. Processor 302 may be a self-contained computing system, containing multiple cores or processors, a bus, memory controller, cache, etc. A multi-core processor may be symmetric or asymmetric. Processor 302 may comprise multiple processors, such as a system having multiple, physically separate processors in different sockets, or a system having multiple processor cores on a single physical chip. Similarly, processor 302 may comprise multiple distributed processors located in multiple separate computing devices but working together such as via a communications network. Multiple processors or processor cores may share resources such as memory 306 or cache 312 or may operate using independent resources. Processor 302 may comprise one or more state machines, an application specific integrated circuit (ASIC), or a programmable gate array (PGA) including a field PGA (FPGA).

Each individual component discussed above may be coupled to system bus 304, which may connect each and every individual component to each other. System bus 304 may be any of several types of bus structures including a memory bus or memory controller, a peripheral bus, and a local bus using any of a variety of bus architectures. A basic input/output (BIOS) stored in ROM 308 or the like, may provide the basic routine that helps to transfer information between elements within information handling system 122, such as during start-up. Information handling system 122 further comprises storage devices 314 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. Storage device 314 may comprise software modules 316, 318, and 320 for controlling processor 302. Information handling system 122 may comprise other hardware or software modules. Storage device 314 is connected to the system bus 304 by a drive interface. The drives and the associated computer-readable storage devices provide nonvolatile storage of computer-readable instructions, data structures, program modules and other data for information handling system 122. In one aspect, a hardware module that performs a particular function comprises the software component stored in a tangible computer-readable storage device in connection with the necessary hardware components, such as processor 302, system bus 304, and so forth, to carry out a particular function. In another aspect, the system may use a processor and computer-readable storage device to store instructions which, when executed by the processor, cause the processor to perform operations, a method or other specific actions. The basic components and appropriate variations may be modified depending on the type of device, such as whether information handling system 122 is a small, handheld computing device, a desktop computer, or a computer server. When processor 302 executes instructions to perform "operations", processor 302 may perform the operations directly and/or facilitate, direct, or cooperate with another device or component to perform the operations.

As illustrated, information handling system 122 employs storage device 314, which may be a hard disk or other types of computer-readable storage devices which may store data that are accessible by a computer, such as magnetic cassettes, flash memory cards, digital versatile disks (DVDs), cartridges, random access memories (RAMs) 310, read only memory (ROM) 308, a cable containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with information handling system 122, an input device 322 represents any number of input mechanisms, such as a microphone for speech, a touch-sensitive screen for gesture or graphical input, keyboard, mouse, motion input, speech and so forth. Additionally, input device 322 may take in data from one or more sensors 116, discussed above. An output device 324 may also be one or more of a number of output mechanisms known to those of skill in the art. In some instances, multimodal systems enable a user to provide multiple types of input to communicate with information handling system 122. Communications interface 326 generally governs and manages the user input and system output. There is no restriction on operating on any particular hardware arrangement and therefore the basic hardware depicted may easily be substituted for improved hardware or firmware arrangements as they are developed.

As illustrated, each individual component described above is depicted and disclosed as individual functional blocks. The functions these blocks represent may be provided through the use of either shared or dedicated hardware, including, but not limited to, hardware capable of executing software and hardware, such as a processor 302, that is purpose-built to operate as an equivalent to software executing on a general-purpose processor. For example, the functions of one or more processors presented in FIG. 3 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) 308 for storing software performing the operations described below, and random-access memory (RAM) 310 for storing results. Very large-scale integration (VLSI) hardware embodiments, as well as custom VLSI circuitry in combination with a general-purpose DSP circuit, may also be provided.

The logical operations of the various methods, described below, are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. Information handling system 122 may practice all or part of the recited methods, may be a part of the recited systems, and/or may operate according to instructions in the recited tangible computer-readable storage devices. Such logical operations may be implemented as modules configured to control processor 302 to perform particular functions according to the programming of software modules 316, 318, and 320.

In examples, one or more parts of the example information handling system 122, up to and including the entire information handling system 122, may be virtualized. For example, a virtual processor may be a software object that executes according to a particular instruction set, even when a physical processor of the same type as the virtual processor is unavailable. A virtualization layer or a virtual "host" may enable virtualized components of one or more different computing devices or device types by translating virtualized operations to actual operations. Ultimately however, virtualized hardware of every type is implemented or executed by some underlying physical hardware. Thus, a virtualization computer layer may operate on top of a physical computer layer. The virtualization computer layer may comprise one or more virtual machines, an overlay network, a hypervisor, virtual switching, and any other virtualization application.

Figure 4:
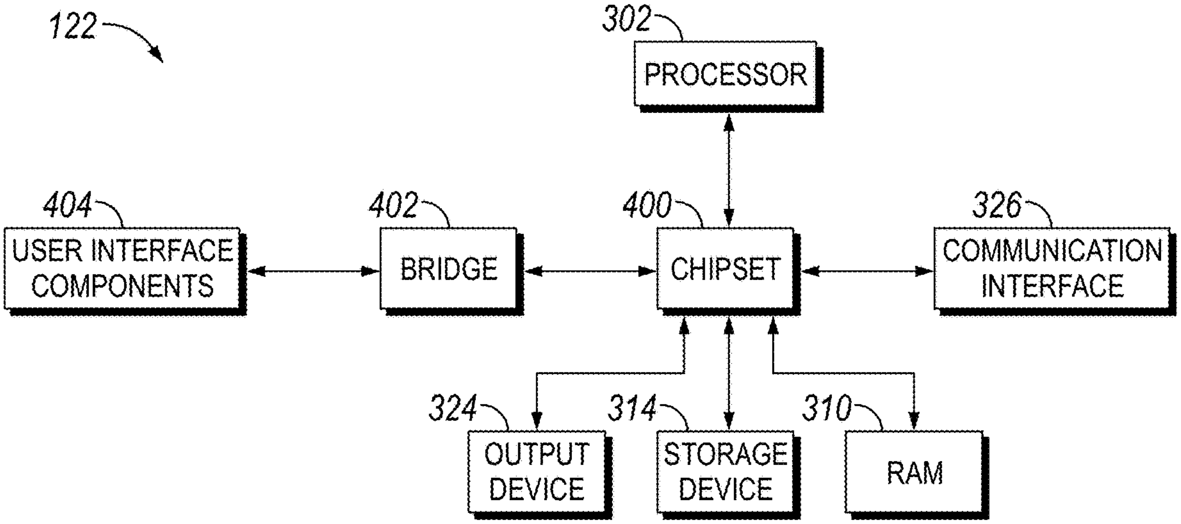
FIG. 4 illustrates the chipset in communication with other components of the information handling system.

FIG. 4 illustrates an example information handling system 122 having a chipset architecture that may be used in executing the described method and generating and displaying a graphical user interface (GUI). Information handling system 122 is an example of computer hardware, software, and firmware that may be used to implement the disclosed technology. Information handling system 122 may comprise a processor 302, representative of any number of physically and/or logically distinct resources capable of executing software, firmware, and hardware configured to perform identified computations. Processor 302 may communicate with a chipset 400 that may control input to and output from processor 302. In this example, chipset 400 outputs information to output device 324, such as a display, and may read and write information to storage device 314, which may comprise, for example, magnetic media, and solid-state media. Chipset 400 may also read data from and write data to RAM 310. A bridge 402 for interfacing with a variety of user interface components 404 may be provided for interfacing with chipset 400. Such user interface components 404 may comprise a keyboard, a microphone, touch detection and processing circuitry, a pointing device, such as a mouse, and so on. In general, inputs to information handling system 122 may come from any of a variety of sources, machine generated and/or human generated.

Chipset 400 may also interface with one or more communication interfaces 326 that may have different physical interfaces. Such communication interfaces may comprise interfaces for wired and wireless local area networks, for broadband wireless networks, as well as personal area networks. Some applications of the methods for generating, displaying, and using the GUI disclosed herein may comprise receiving ordered datasets over the physical interface or be generated by the machine itself by processor 302 analyzing data stored in storage device 314 or RAM 310. Further, information handling system 122 receives inputs from a user via user interface components 404 and executes appropriate functions, such as browsing functions by interpreting these inputs using processor 302.

In examples, information handling system 122 may also comprise tangible and/or non-transitory computer-readable storage devices for carrying or having computer-executable instructions or data structures stored thereon. Such tangible computer-readable storage devices may be any available device that may be accessed by a general purpose or special purpose computer, including the functional design of any special purpose processor as described above. By way of example, and not limitation, such tangible computer-readable devices may comprise RAM, ROM, EEPROM, CD-ROM or other optical disk storage, magnetic disk storage or other magnetic storage devices, or any other device which may be used to carry or store desired program code in the form of computer-executable instructions, data structures, or processor chip design. When information or instructions are provided via a network, or another communications connection (either hardwired, wireless, or combination thereof), to a computer, the computer properly views the connection as a computer-readable medium. Thus, any such connection is properly termed a computer-readable medium. Combinations of the above should also be comprised within the scope of the computer-readable storage devices.

Computer-executable instructions comprise, for example, instructions and data which cause a general-purpose computer, special purpose computer, or special purpose processing device to perform a certain function or group of functions. Computer-executable instructions also comprise program modules that are executed by computers in standalone or network environments. Generally, program modules comprise routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

In additional examples, methods may be practiced in network computing environments with many types of computer system configurations, including personal computers, hand-held devices, multi-processor systems, microprocessor-based or programmable consumer electronics, network PCs, minicomputers, mainframe computers, and the like. Examples may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices. During drilling operations information handling system 122 may process different types of the real time data which may be utilized to create an asphaltene onset pressure map (AOP).

Figure 5:
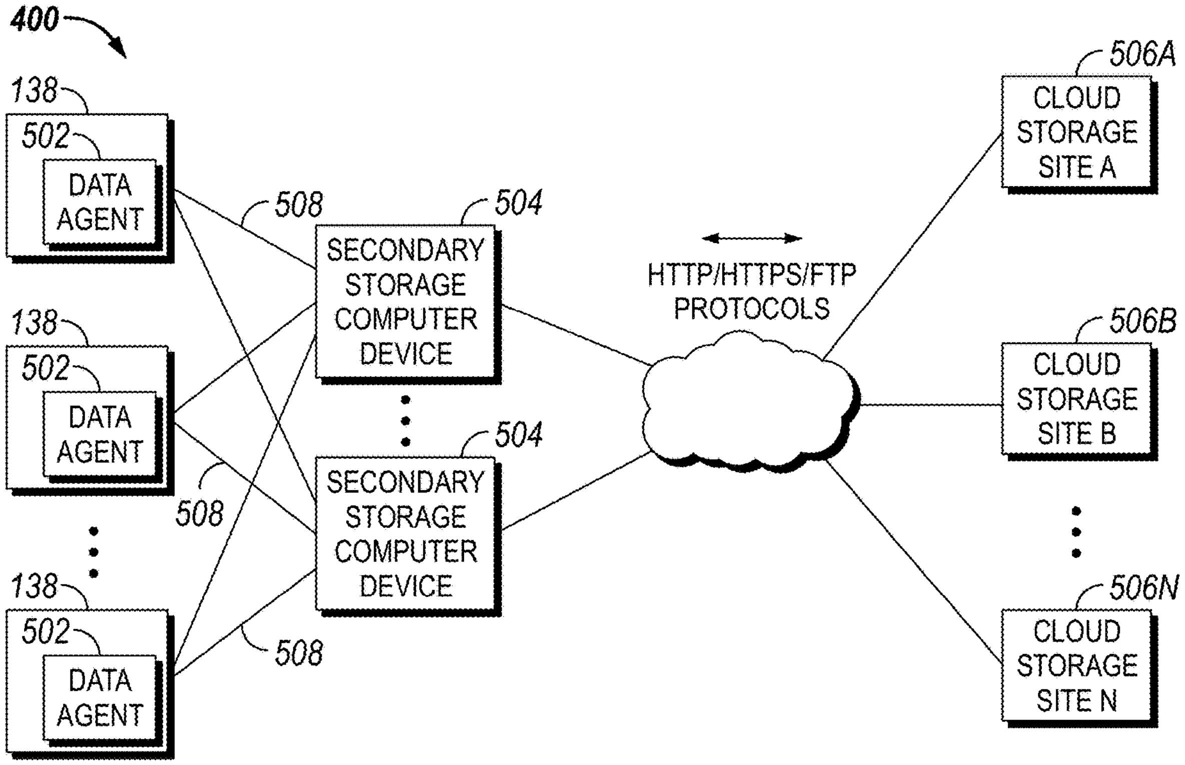
FIG. 5 illustrates a schematic view of a cloud-based system.

FIG. 5 illustrates an example of one arrangement of resources in a computing network 500 that may employ the processes and techniques described herein, although many others are of course possible. As noted above, an information handling system 122, as part of their function, may utilize data, which comprises files, directories, metadata (e.g., access control list (ACLS) creation/edit dates associated with the data, etc.), and other data objects. The data on the information handling system 122 is typically a primary copy (e.g., a production copy). During a copy, backup, archive or other storage operation, information handling system 122 may send a copy of some data objects (or some components thereof) to a secondary storage computing device 504 by utilizing one or more data agents 502.

A data agent 502 may be a desktop application, website application, or any software-based application that is run on information handling system 122. As illustrated, information handling system 122 may be disposed at any rig site (e.g., referring to FIG. 1) or repair and manufacturing center. Data agent 502 may communicate with a secondary storage computing device 504 using communication protocol 508 in a wired or wireless system. Communication protocol 508 may function and operate as an input to a website application. In the website application, field data related to pre- and post-operations, generated DTCs, notes, and the like may be uploaded. Additionally, information handling system 122 may utilize communication protocol 508 to access processed measurements, operations with similar DTCs, troubleshooting findings, historical run data, and/or the like. This information is accessed from secondary storage computing device 504 by data agent 502, which is loaded on information handling system 122.

Secondary storage computing device 504 may operate and function to create secondary copies of primary data objects (or some components thereof) in various cloud storage sites 506A-N. In examples, cloud storage sites 506A-N may be one or more databases located on site or offsite. Additionally, secondary storage computing device 504 may run determinative algorithms on data uploaded from one or more information handling systems 122, discussed further below. Communications between the secondary storage computing devices 504 and cloud storage sites 506A-N may utilize REST protocols (Representational state transfer interfaces) that satisfy basic C/R/U/D semantics (Create/Read/Update/Delete semantics), or other hypertext transfer protocol ("HTTP")-based or file-transfer protocol ("FTP")-based protocols (e.g., Simple Object Access Protocol).

In conjunction with creating secondary copies in cloud storage sites 506A-N, the secondary storage computing device 504 may also perform local content indexing and/or local object-level, sub-object-level or block-level deduplication when performing storage operations involving various cloud storage sites 506A-N. Cloud storage sites 506A-N may further record and maintain DTC code logs for each downhole operation or run, map DTC codes, store repair and maintenance data, store operational data, and/or provide outputs from determinative algorithms that are fun at cloud storage sites 506A-N. This type of network may be utilized to an asphaltene onset pressure map (AOP).

Figure 6:
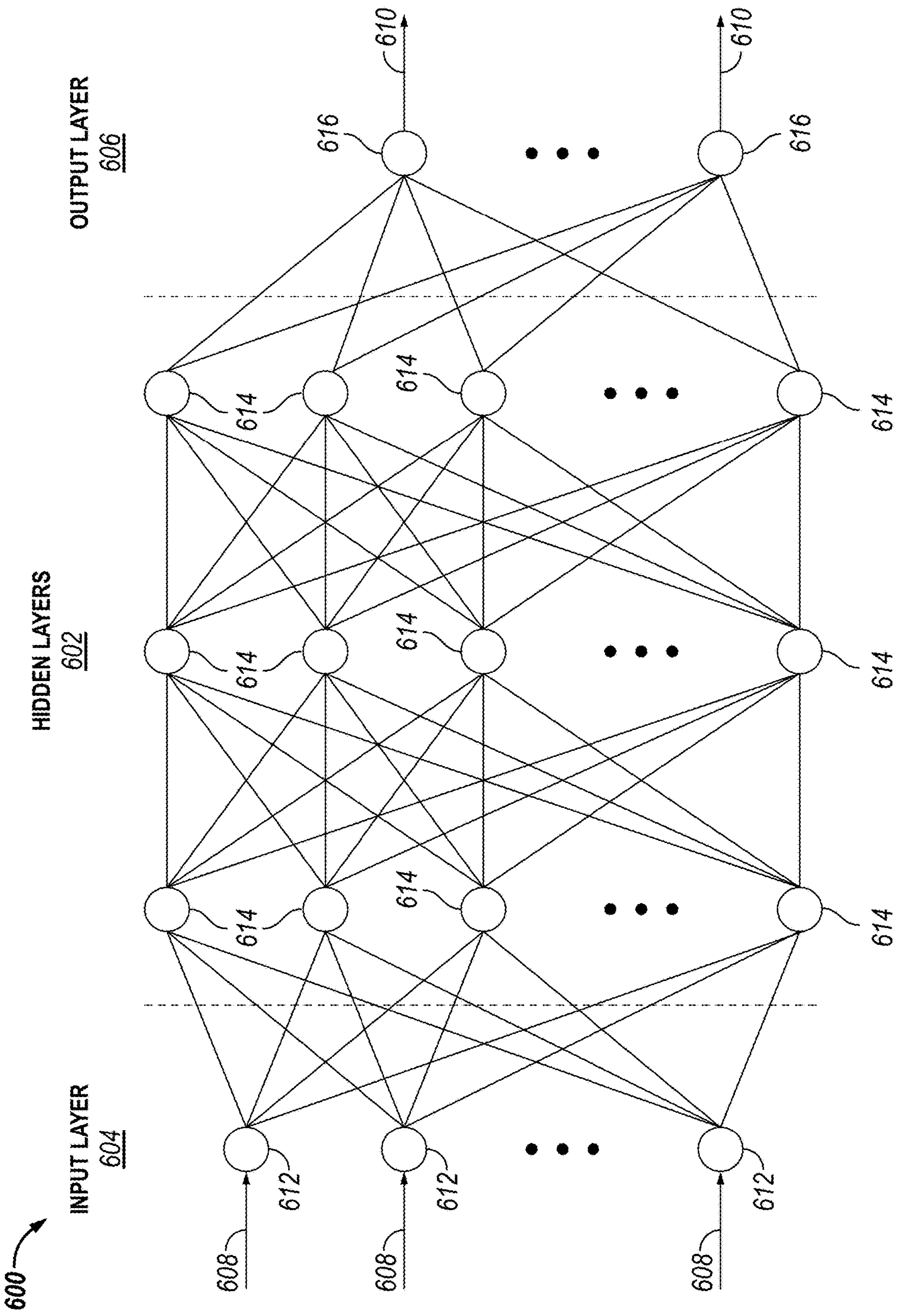
FIG. 6 illustrates a neural network.

FIG. 6 illustrates neural network (NN) 600. NN 600 may operate utilizing one or more information handling systems 122 (e.g., referring to FIGS. 1 and 2) on computing network 500. Although a NN is illustrated, multiple models may be used with input output structures. These models may comprise flexible empirical models such as NN, gaussian processing methods, kriging methods, evolutionary methods such as genetic algorithms, classification methods, clustering methods empirical methods, or physics-based methods such as equations of state, thermodynamic models, geological, geochemistry, or chemistry models, or kinetic models or any combinations therein including recursive combinations of similar or dissimilar models and iterative model combinations. A NN 600 is an artificial neural network with one or more hidden layers 602 between input layer 604 and output layer 606. In examples, NN 600 may be software on a single information handling system 122. In other examples, NN 600 may software running on multiple information handling systems 122 connected wirelessly and/or by a hard-wired connection in a network of multiple information handling systems 122.

Herein, NN 600 may be applied in a wide array of implementations. For example, NN 600 may be modeled for forming an AOP map, reservoir simulation, production decisions, or single AOP determinations. UAOP, the ARFO, or the BP from the gravimetric test are used in a NN model to identify the first AOP or the second AOP.

As such, input layer 604 may comprise any number of inputs 608. Inputs 608 may comprise properties of fluid and/or fluid formations such as physical properties (bulk or molecular) such as density, index of refraction, compressibility, bubble point, phase and/or other phase behavior properties measured by sampling tool 100. In examples, inputs may also comprise transport properties such as viscosity or thermal conductivity. Fluid analysis modules 118 may determine optical, chromatographic, mass spectrometry, density sensor, viscosity sensor, phase change apparatus compressibility sensor resistivity sensor, capacitance or dielectric sensor acoustic sensor, or combinations therein. Additionally, inputs 608 may also comprise chemical properties including composition i.e., hydrocarbon composition (methane, ethane propane, butane, pentane, hexane, higher hydrocarbons) and or chemical classes such as but not limited to Saturates, Aromatics, Resins or Asphaltenes chemical classes, and their respective concentrations of the various components, pH, eH, chemical potential, reactivity, fluid compatibility, and/or scaling potential. Fluid analysis modules 118 may determine optical, chromatographic, mass spectrometry, density sensor, viscosity sensor, phase change apparatus compressibility sensor resistivity sensor, capacitance or dielectric sensor acoustic sensor, or combinations therein. In other examples, inputs may comprise raw sensor measurements such as temperature, pressure, optical information, acoustic information, and/or electromagnetic information. Fluid analysis modules 118 may determine optical, chromatographic, mass spectrometry, density sensor, viscosity sensor, phase change apparatus compressibility sensor resistivity sensor, capacitance or dielectric sensor acoustic sensor, or combinations therein. In examples, output layer 606 may form outputs 610. Outputs 610 may comprise other unmeasured or less well measured physical or chemical properties, and/or correlated sensor measurements. For instance, outputs 610 may comprise scaling potential, or asphaltene onset pressure if not directly measured. Alternatively, the model may provide outputs 610 for enhanced resolution, precision or accuracy refinement of a measured property such as bubble point, or asphaltene onset pressure which may be comprised as an input 608 but refined as an enhanced measurement as an output 610 in output layer 606. Any of the inputs 608 or outputs 610 may be from the current well being evaluated or analogue wells which may be in the field, in the basis, or not so if other characteristics such as but not limited to formation type or formation fluid provide a basis for analogy. During operations, inputs 608 data are given to neurons 612 in input layer 604. Neurons 612, 614, and 616 are defined as individual or multiple information handling systems 122 connected in a network, which may compute information to make drilling, completion or production decisions such as but not limited how to drill the well, where to drill the well, how to complete a well, or where to complete a well, or how to produce a well, or where to produce a well. Any of computations may be from the current well being evaluated or analogue wells which may be in the field, in the basis, or not so if other characteristics such as but not limited to formation type or formation fluid provide a basis for analogy. The output from neurons 612 may be transferred to one or more neurons 614 within one or more hidden layers 602. Hidden layers 602 comprises one or more neurons 614 connected in a network that further process information from neurons 612. The number of hidden layers 602 and neurons 612 in hidden layer 602 may be determined by personnel that design NN 600. Hidden layers 602 is defined as a set of information handling system 122 assigned to specific processing. Hidden layers 602 spread computation to neurons 614, which may allow for faster computing, processing, training, and learning by NN 600. Output layers 606 may combine the processing in hidden layers 602, using neurons 616, to form an asphaltene onset pressure (AOP). By any of the modeling methods, output layers 606, wherein other methods may use different layer or subfunction structuring, may be coordinated such that simultaneously an AOP may be provided for different outputs each corresponding to a different depths or lateral distance across a field or distance from an injecting well, temperature or other state condition comprising at least formation or concentration of materials. Multiple outputs may be coordinated wherein the multiple outputs are different but related parameters which may comprise but is not limited to asphaltene onset pressure, and asphaltene stability index, either static for a single state, or as a function independent variable such as but not limited to depth or lateral distance across a field or distance from an injecting well or of state variables such as but not limited to temperature.

Figure 7:
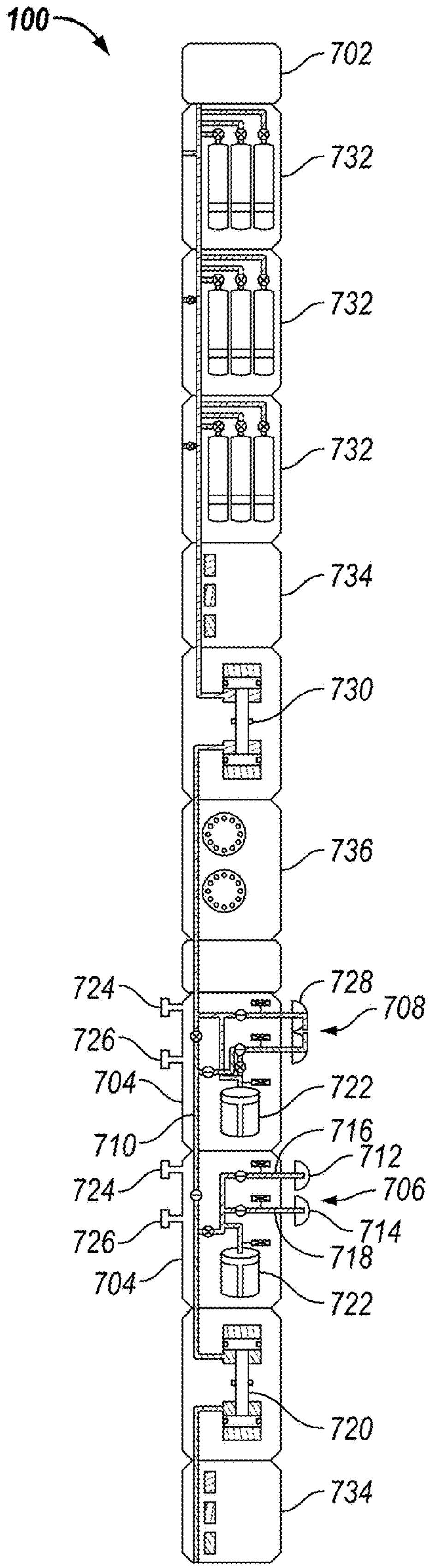
FIG. 7 illustrates a schematic view of an example embodiment of a fluid sampling tool.

FIG. 7 illustrates a schematic of fluid sampling tool 100. As illustrated, fluid sampling tool 100 comprises a power telemetry section 702 through which fluid sampling tool 100 may communicate with other actuators and sensors in a conveyance (e.g., conveyance 102 on FIG. 1 or drill string 200 on FIG. 2), the conveyance's communications system, such as information handling system 122 (e.g., referring to FIG. 1). In examples, power telemetry section 702 may also be a port through which the various actuators (e.g., valves) and sensors (e.g., temperature and pressure sensors) in fluid sampling tool 100 may be controlled and monitored. In examples, power telemetry section 702 may comprise an additional information handling system 122 (not illustrated) that exercises the control and monitoring function. In one example, the control and monitoring function is performed by an information handling system 122 in another part of the drill string or fluid sampling tool 100 (not shown) or by an information handling system at surface 112.

Information from fluid sampling tool 100 may be gathered and/or processed by the information handling system 122 (e.g., referring to FIGS. 1 and 2). The processing may be performed real-time during data acquisition or after recovery of fluid sampling tool 100. Processing may alternatively occur downhole or may occur both downhole and at surface 112. In some examples, signals recorded by fluid sampling tool 100 may be conducted to information handling system 122 by way of conveyance (e.g., conveyance 102 on FIG. 1 or drill string 200 on FIG. 2). Information handling system may process the signals, and the information contained therein may be displayed for an operator to observe and stored for future processing and reference. Information handling system may also contain an apparatus for supplying control signals and power to fluid sampling tool 100.

In examples, fluid sampling tool 100 may comprise one or more enhanced probe sections 704 and stabilizers 724 and 726. Each enhanced probe section 704 may comprise a dual probe section 706 or a focus sampling probe section 708. Both of which may extract fluid from the reservoir and deliver said fluid to a channel 710 that extends from one end of fluid sampling tool 100 to the other. Without limitation, dual probe section 706 comprises two probes 712 and 714 which may extend from fluid sampling tool 100 and press against the inner wall of wellbore 104 (e.g., referring to FIG. 1). Probe channels 716 and 718 may connect probe 712 and 714 to channel 710 and allow for continuous fluid flow from the formation 106 to channel 710. A high-volume bidirectional pump 720 may be used to pump fluids from the formation, through probe channels 716 and 718 and to channel 710. Alternatively, a low volume pump bi direction piston 722 may be used to remove reservoir fluid from the reservoir and house them for asphaltene measurements, discussed below. Two standoffs or stabilizers 724 and 726 hold fluid sampling tool 100 in place as probes 712 and 714 press against the wall of wellbore 104. In examples, probes 712 and 714 and stabilizers 724 and 726 may be retracted when fluid sampling tool 100 may be in motion and probes 712 and 714 and stabilizers 724 and 726 may be extended to sample the formation fluids at any suitable location in wellbore 104. As illustrated, probes 712 and 714 may be replaced, or used in conjunction with, focus sampling probe section 708. Focus sampling probe section 708 may operate and function as discussed above for probes 712 and 714 but with a single probe 728. Other probe examples may comprise, but are not limited to, oval probes, packers, or circumferential probes.

In examples, channel 710 may connect other parts and sections of fluid sampling tool 100 to each other. Additionally, a second high-volume bidirectional pump 730 may pump fluid through channel 710 to one or more multi-chamber sections 732, one or more fluid density modules 734, and/or one or more optical analyzers 736.

Figure 8:
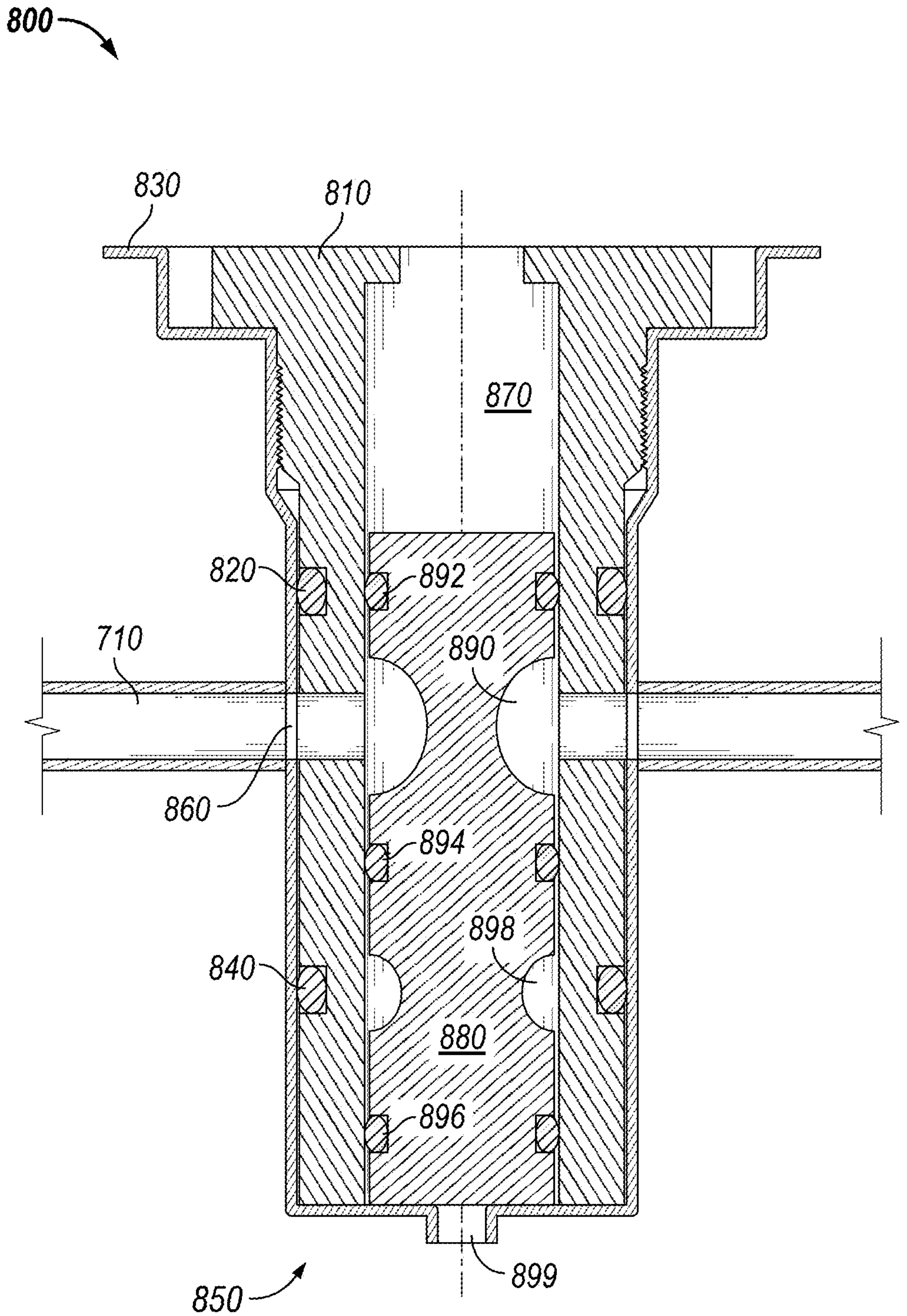
FIG. 8 illustrates a schematic of fluid sampling vessel of an example embodiment in a fluid sampling tool.

FIG. 8 illustrates a schematic of a fluid sampling vessel 800 of an example embodiment in fluid sampling tool 100. As illustrated, fluid sampling vessel 800 may be in fluid communication with channel 710 (referring to FIG. 7) and may be in one or more multi-chamber sections 732. One or more multi-chamber sections 732 may comprise at least six fluid sampling vessel 800, at least ten fluid sampling vessel 800, at least twelve fluid sampling vessel 800, at least thirteen fluid sampling vessel 800, at least fifteen fluid sampling vessel 800, at least sixteen fluid sampling vessel 800, at least eighteen fluid sampling vessel 800, or at least twenty fluid sampling vessel 800. Fluid sampling vessel 800 includes at least one removable cartridge 810 in fluid communication with channel 710. A seal 820 prevents fluid communication between channel 710 and fluid sampling vessel exterior 830. Another seal 840 prevents fluid communication between channel 710 and of the fluid sampling vessel interior 850. Between seals 820 and 840 is a fluid inlet/outlet 860. Through removable cartridge 810 is a bore section 870 suitable to be isolated from fluid inlet/outlet 860. Inside removable cartridge 810 is a rod 880 that has a storage cavity 890 for potential fluid storage, protected on either side by seals 892 and 894. Storage cavity 890 may include from about 0.1 mL to about 1000 mL, or everything in between, or from about 0.1 mL to about 500 mL, or from about 0.1 mL to about 100 mL, or from about 0.5 mL to about 75 mL, or from about 1 mL to about 50 mL, or from about 2.5 mL to about 25 mL, or from about 5 mL to about 20 mL, or from about 10 mL to about 15 mL of the fluid being collected. Bore section 870 may be isolated from fluid inlet/outlet 860 of channel 710 by seal 892, thus capturing a reservoir fluid sample. After this isolation has taken place, channel 710 is isolated from oil-filled fluid sampling vessel interior 850 via seal 896. Reservoir fluid in channel 710 of the fluid sampling tool 100 may still pass through cartridge 810 and rod 880 because of clearance 898. However, rod 880 may be shifted upward by hydraulic oil that may enter port 899 and lock rod 880 into a captured-sample position, thus completely isolating the captured downhole fluid sample.

Figure 9:
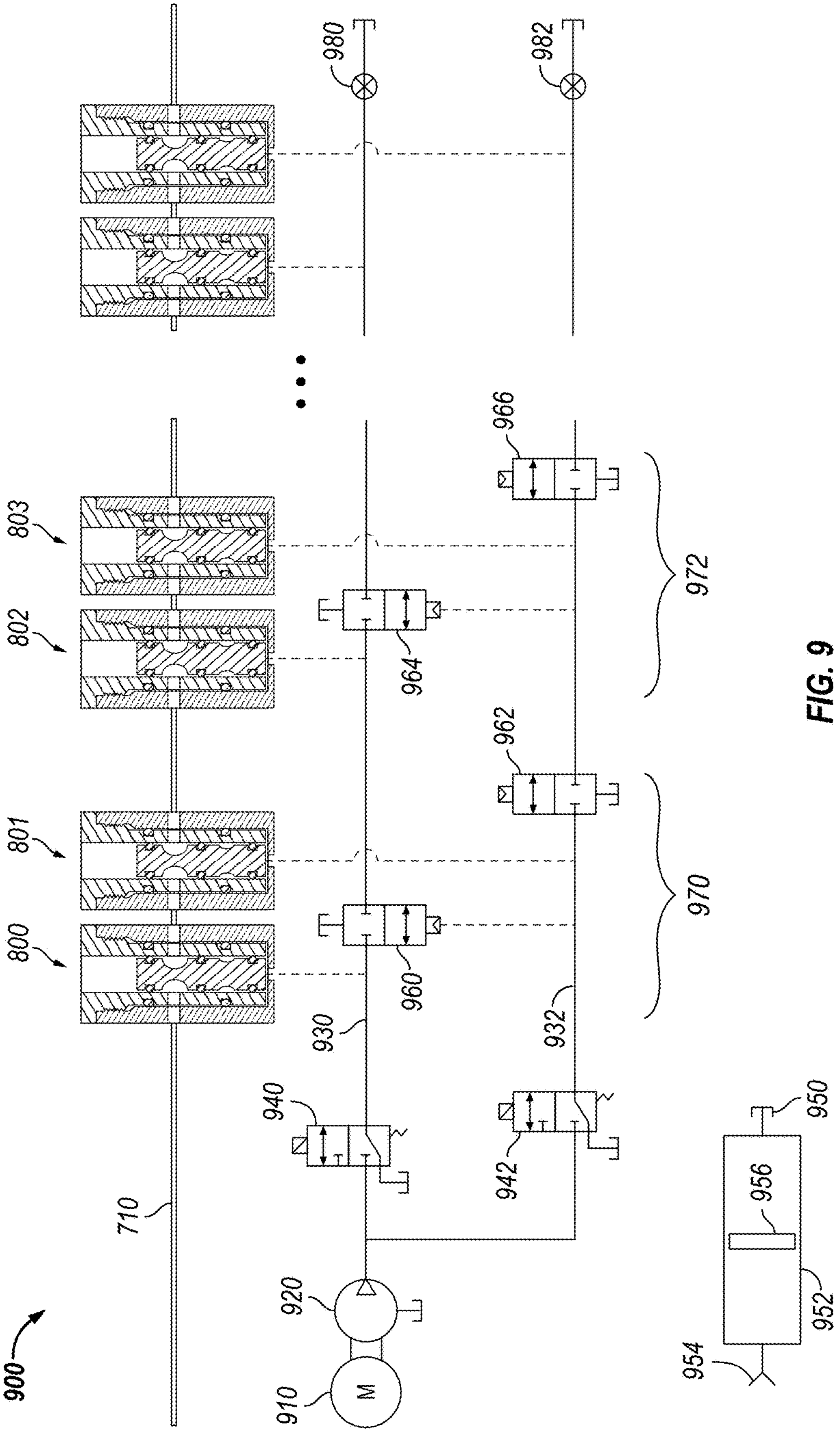
FIG. 9 illustrates a schematic of a system with a large number of fluid sampling vessels according to one embodiment of the present disclosure.

FIG. 9 illustrates a schematic of a system 900 with a large number of fluid sample capturing vessels (800. 801, 802, 803, etc.) according to one embodiment of the present disclosure. System 900 includes a source of hydraulic power in electric motor 910 and hydraulic pump 920. The output of hydraulic pump 920 is potentially connected to a primary bus 930 through a solenoid valve 940 (in this embodiment a three-port two-position normally closed variety). Hydraulic pump 920 may also be connected to a secondary bus 932 through an additional solenoid valve 942. Solenoid valve 942 return line is connected to compensated oil line 950. This compensation is achieved through a compensator system 952 that communicates external pressure through a vent 954 to internal oil pressure through a piston 956. Initially, hydraulically actuated valves 960 and 962 are in closed position to prevent pressure from reaching hydraulically actuated valves 964 and 966. An algorithm controlled at surface or downhole or a combination thereof proceeds by first energizing solenoid valve 940 and thereby pressurizing primary bus 930, causing initial sample capturing vessel 800 to actuate. Solenoid valve 940 is then deenergized to permit primary bus to return to compensator system 952 pressure. However initial sample capturing vessel 800 remains in its state. Then, solenoid valve 942 is energized and pressurizes secondary bus 932, causing second sample capturing vessel 801 to actuate, and additionally causing first hydraulically actuated valve 960 to shift open. The opening of valve 960 has no immediate effect. However, it will permit pressure of the opposite bus to extend further down its line in future steps. Solenoid valve 942 is deenergized permitting secondary bus 932 to return to compensated pressure. Now all steps mentioned in the previous paragraph may be repeated in a loop to continue capturing samples. When the next pressurization of primary bus 930 occurs, second hydraulically actuated valve 962 will shift open removing an obstruction to secondary bus 932, such that further actuations downstream are unimpacted by upstream valves. The collection of the first two sample capturing vessels 800 and 801 and the first two hydraulically actuated valves 960 and 962 may be collectively considered a tile 970 of a repeatable unit that may be duplicated in any amount in the design of the one or more multi-chamber sections 732. The continued alternating pressurization of the two busses will continue to advance the unobstructed access of the pump 920 to successive section 972 comprising fluid sample capturing vessels 802 and 803 and hydraulically actuated valves 964 and 966 and will thereby close fluid sample capturing vessels 802 and 803. Manual valves 980 and 982 are placed at the end of the sequence on the primary bus 930 and secondary bus 932, respectfully, to aid in maintenance.

Figure 10:
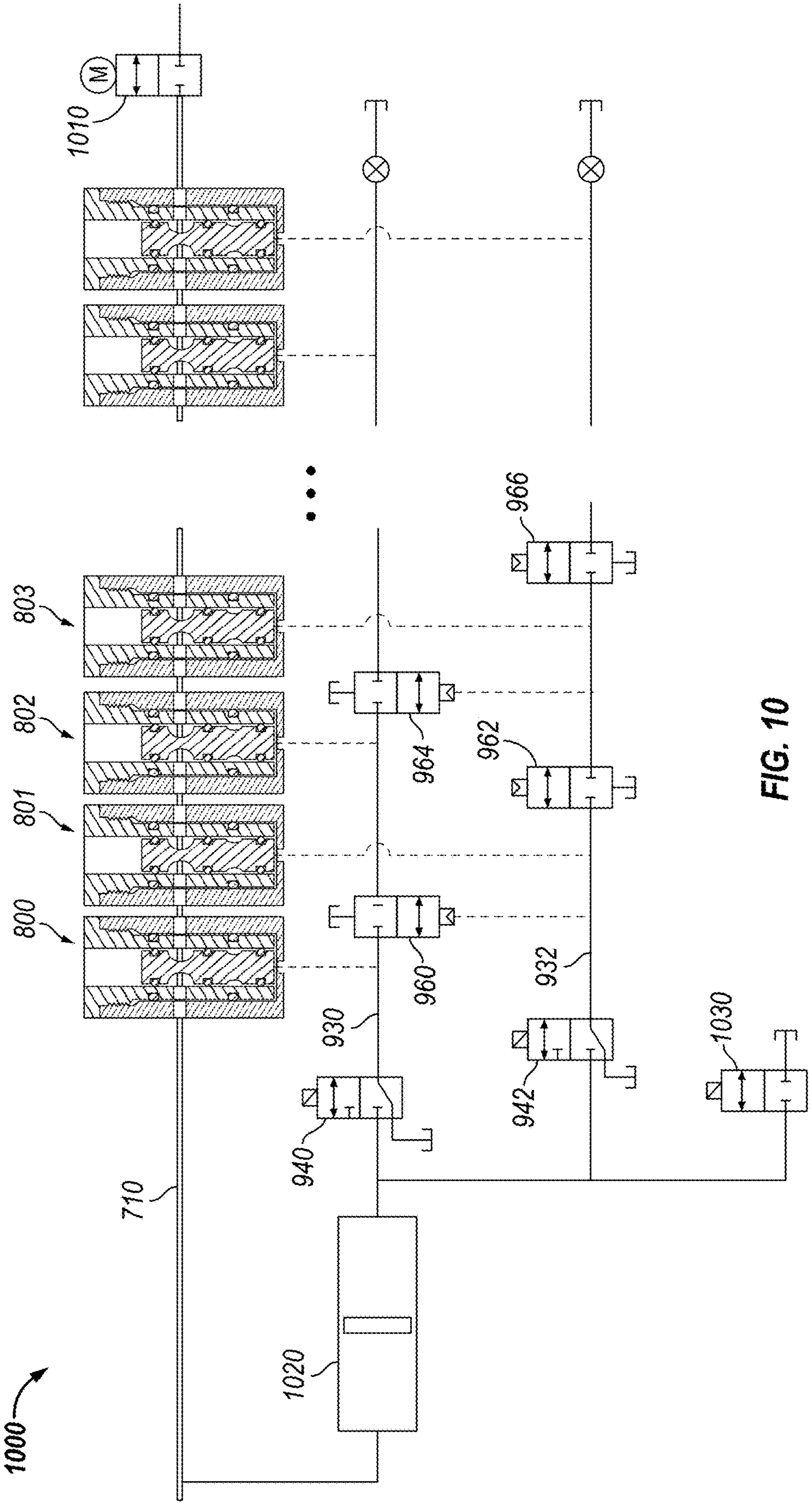
FIGS. 10-14 illustrate schematics of other systems with a large number of fluid sampling vessels according to other embodiments of the present disclosure, wherein two bus lines are utilized.

FIG. 10 illustrates a schematic of another system 1000 with a large number of fluid sample capturing vessels (800. 801, 802, 803, etc.) according to another embodiment of the present disclosure. As illustrated, hydraulically actuated valves 960 and 962 are initially closed and their piloting pressure referenced to external vent 954 instead of referencing them to compensated oil line 950. In system 1000, power from channel 710 may be used instead of deriving power from motor 910 and hydraulic pump 920. When a motorized valve 1010 closes on the sample line, it will have the capacity to build positive pressure. That pressure may be directed via piston 1020 to energize the hydraulic oil instead of a pump. The pistons position may be reset upon reaching end-of-stroke by using a solenoid valve 1030.

Figure 11:
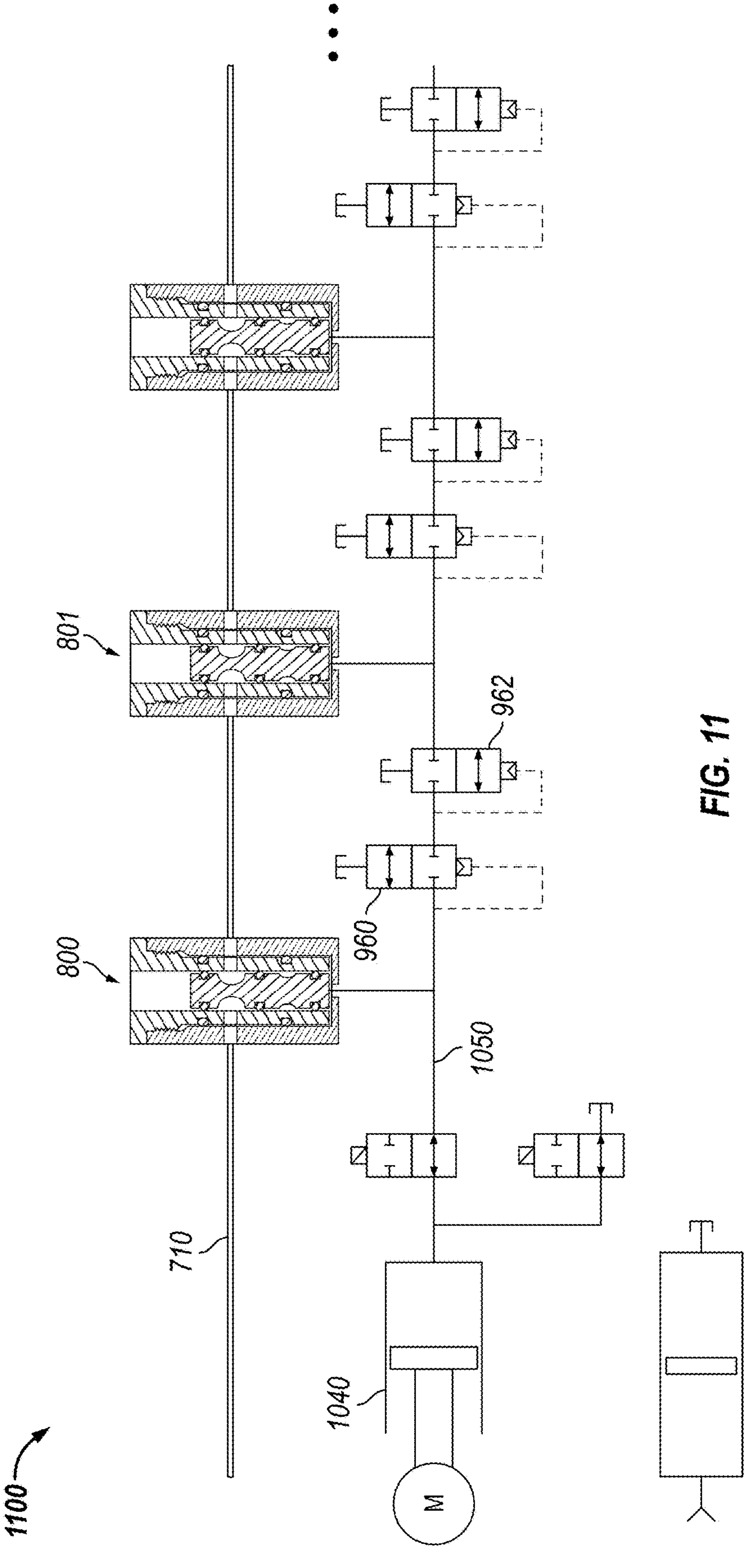

FIG. 11 illustrates a schematic of another system 1100 with a large number of fluid sampling vessels (800. 801, 802, etc.) according to another embodiment of the present disclosure. A Reciprocating pump 1040 may be used to generate both positive and negative gage pressure on one single hydraulic line 1050. In this instance, initially closed hydraulic valve 960 is opened (and thereby unobstructed from the bus line 1050) by pulling with negative pressure on the hydraulic line. Then, initially closed hydraulic valve 962 is opened (and thereby unobstructed from the bus line 1050) by pushing with positive pressure on the hydraulic line. In this embodiment, both the sample capture vessels 800 and the hydraulic valves 960 and 962 must use a latching mechanism to retain their position after being actuated.

Figure 12:
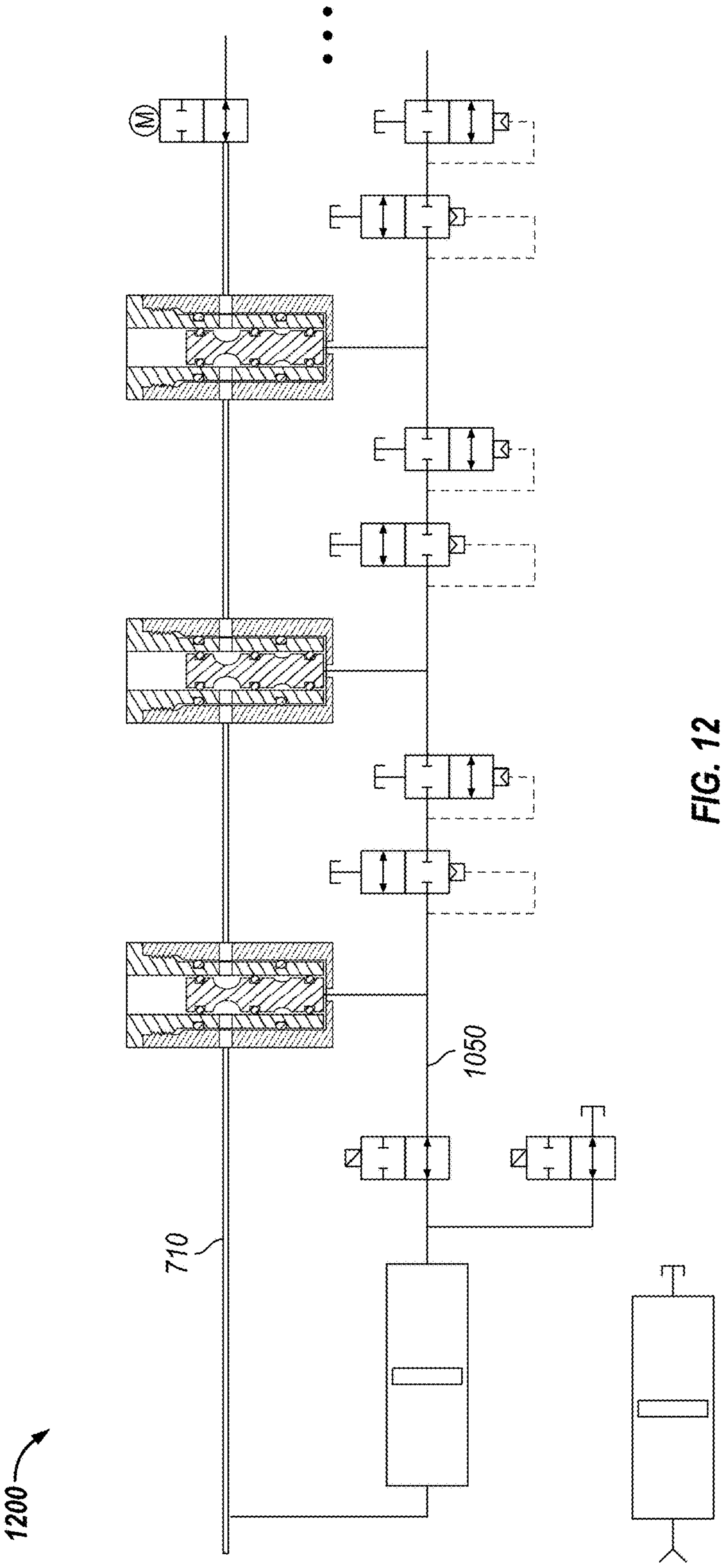

FIG. 12 illustrates a schematic of another system 1200 with a large number of fluid sampling vessels (800. 801, 802) according to another embodiment of the present disclosure, wherein a combination of system 1000 (e.g., referring to FIG. 10) and system 1100 (e.g., referring to FIG. 11) is used utilizing the power from sample line 710 to communicate positive and negative pressure on a singular bus 1050.

Figure 13:
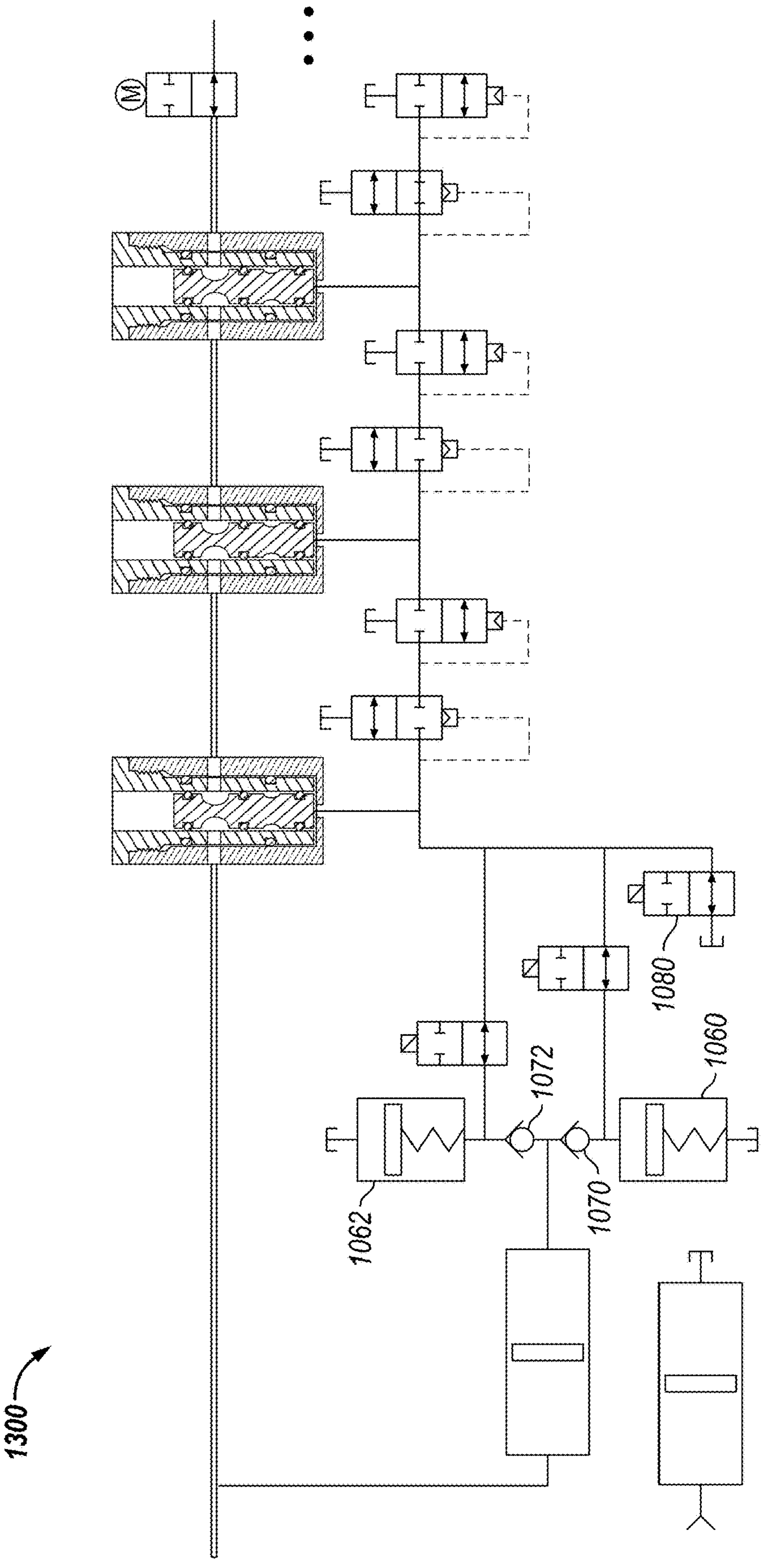

FIG. 13 illustrates a schematic of another system 1300 with a large number of fluid sampling vessels (800. 801, 802, etc.) according to another embodiment of the present disclosure, wherein an accumulator 1060 is used to hold positive hydraulic pressure and accumulator 1062 to hold negative pressure are placed in system 1200 (e.g., referring to FIG. 12) along with check valves 1070 and 1072. Fluid is pumped into accumulator 1060 through check valve 1070 and fluid is pumped out of accumulator 1062 through check valve 1072. The bus pressure may be equalized through solenoid valve 1080.

Figure 14:
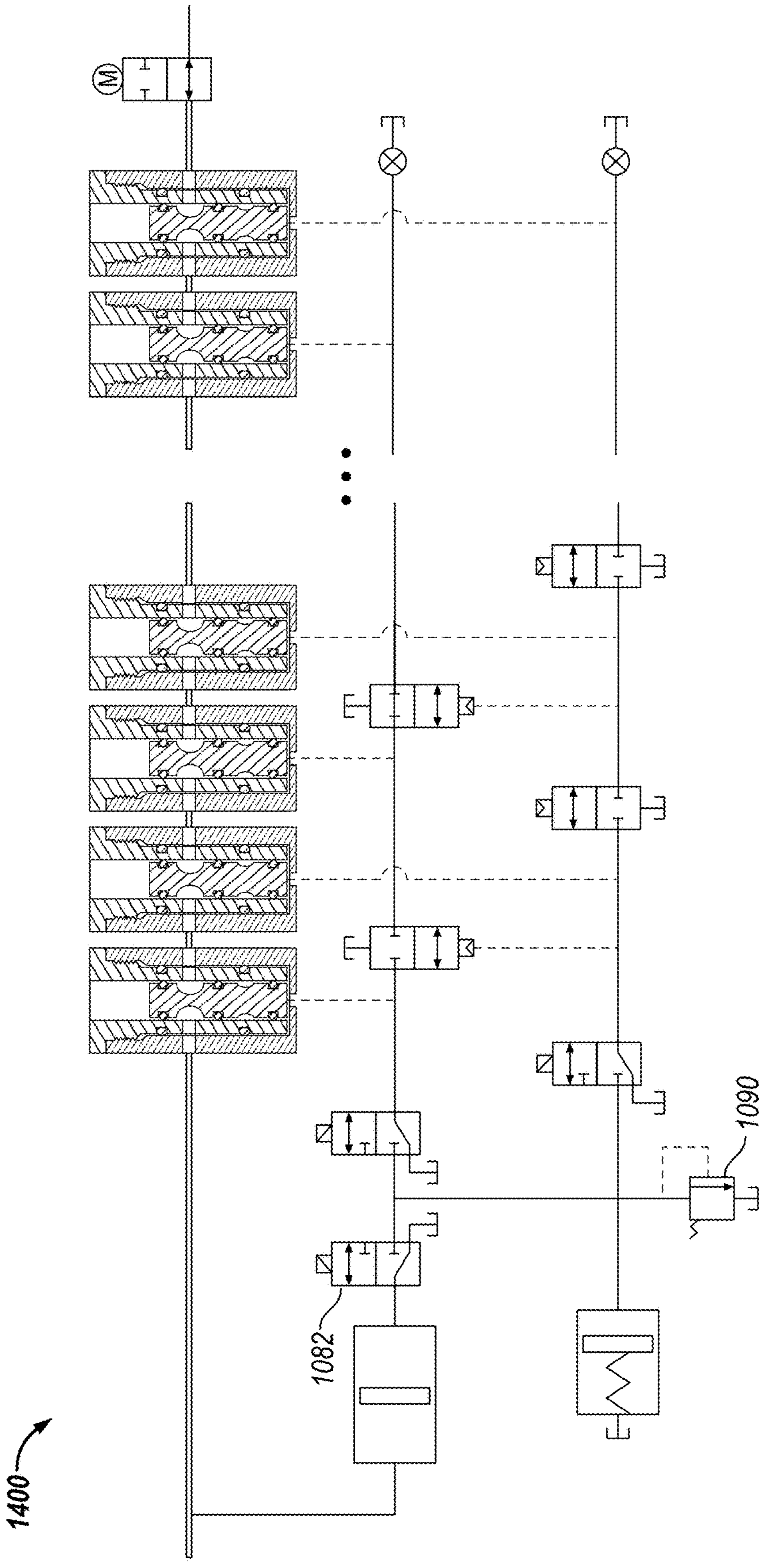

FIG. 14 illustrates a schematic of another system 1400 with a large number of fluid sample capturing vessels (800. 801, 802, 803, etc.) according to another embodiment of the present disclosure, wherein power from channel 710 is used to charge an accumulator by energizing solenoid valve 1082. A pressure relief valve 1090 prevents excessive trapped pressure.

Figure 15:
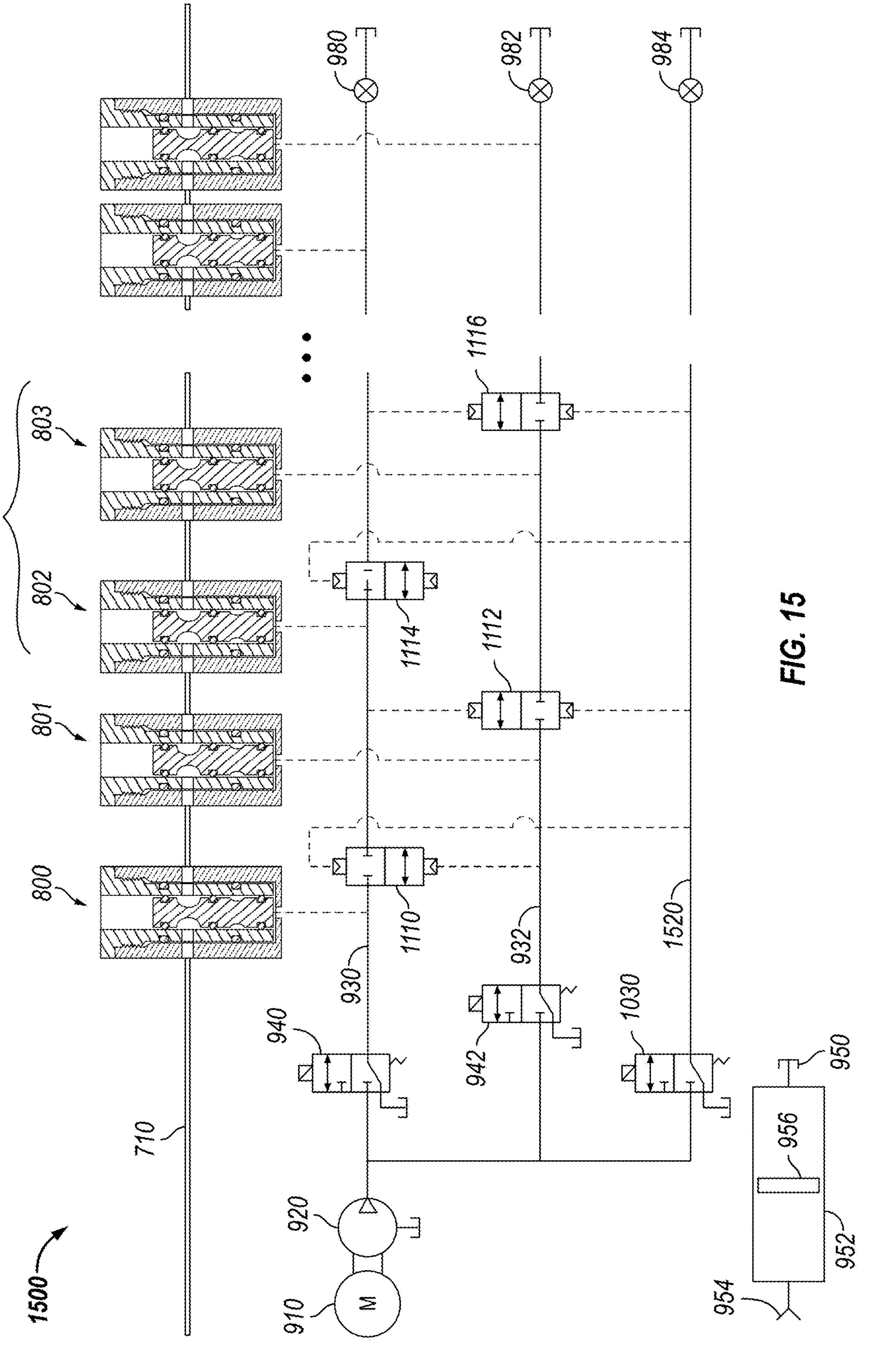
FIG. 15 illustrates a schematic of another system with a large number of fluid sampling vessels according to another embodiment of the present disclosure, wherein three bus lines are utilized.

FIG. 15 illustrates a schematic of another system 1500 with a large number of fluid sample capturing vessels (800, 801, 802, 803, etc.) according to another embodiment of the present disclosure, wherein three bus lines (930, 932, 1520) are utilized and trapped pressure is avoided. System 1500 includes a source of hydraulic power in electric motor 910 and hydraulic pump 920. The output of hydraulic pump 920 is connected to a primary bus 930 through a solenoid valve 940 (in this embodiment a three-port two-position normally closed variety), a secondary bus 932 through solenoid valve 942, and a tertiary bus 1520 through a solenoid valve 1030. Solenoid valve 1030 return line is connected to compensated oil line 950. This compensation is achieved through a compensator system 952 that communicates external pressure through a vent 954 to internal oil pressure through a piston 956. Fluid sampling tool 100 is sent downhole with all valves open. Then, tertiary bus 1520 is pressurized through energizing solenoid valve 1030. Solenoid valve 1030 can be used to apply pressure to tertiary bus 1520 once downhole to ensure every valve (i.e., 1110, 1112, 1114, 1116) is closed before starting any operation. This causes all hydraulically shifted valves to close. Then solenoid valve 1030 is deenergized and tertiary bus 1520 returns to ambient pressure.

Once ambient pressure has been acquired, the sampling capturing operation described above in FIG. 9 may proceed. However, in FIG. 15, tertiary bus 1520 is also added to operations to increase the number of fluid sample capturing vessels (800, 801, 802, 803, etc.) that may be utilized as compared to FIG. 9. System 1500 includes a source of hydraulic power in electric motor 910 and hydraulic pump 920. The output of hydraulic pump 920 is potentially connected to a primary bus 930 through a solenoid valve 940 (in this embodiment a three-port two-position normally closed variety), a secondary bus 932 through solenoid valve 942, and a tertiary bus 1520 through a solenoid valve 1030. Solenoid valve 942 return line is connected to compensated oil line 950. This compensation is achieved through a compensator system 952 that communicates external pressure through a vent 954 to internal oil pressure through a piston 956. Initially, hydraulically actuated valves 1110 and 1112 in closed position to prevent pressure from reaching hydraulically actuated valves 1114 and 1116. An algorithm proceeds by first energizing solenoid valve 940 and thereby pressurizing primary bus 930, causing initial sample capturing vessel 800 to actuate. Solenoid valve 940 is then deenergized to permit primary bus to return to compensator system 952 pressure. However initial sample capturing vessel 800 remains in its state. Then, solenoid valve 942 is energized and pressurizes secondary bus 932, causing second sample capturing vessel 801 to actuate, and additionally causing first hydraulically actuated valve 1110 to shift open. The opening of valve 1110 has no immediate effect. However, it will permit pressure of the opposite bus to extend further down its line in future steps. Solenoid valve 942 is deenergized permitting secondary bus 932 to return to compensated pressure. Now all steps mentioned in the previous paragraph may be repeated in a loop to continue capturing samples. When the next pressurization of primary bus 930 occurs, second hydraulically actuated valve 1112 will shift open removing an obstruction of secondary bus 932, such that further actuations downstream are unimpacted by upstream valves. The collection of the first two sample capturing vessels 800 and 801 and the first two hydraulically actuated valves 1110 and 1112 may be collectively considered a tile 970 (referring to FIG. 9) of a repeatable unit that may be duplicated in any amount in the design of the one or more multi-chamber sections 732 (referring to FIG. 7). The continued alternating pressurization of the three busses will continue to advance the unobstructed access of the pump 920 to further section 972 comprising fluid sample capturing vessels 802 and 803 and hydraulically actuated valves 1114 and 1116 and will thereby close fluid sample capturing vessels 802 and 803. Manual valves 980, 982, and 984 are placed at the end of the sequence on the primary bus 930, secondary bus 932, and tertiary bus 1520, respectfully, to aid in maintenance.

The systems and methods for downhole sampling of a large number of samples include any of the various features of the systems and methods disclosed herein, including one or more of the following statements.

Statement 1: A system comprising a fluid sampling tool comprising: at least one probe in fluid communication with a formation; at least one passageway that passes through the at least one probe and into the fluid sampling tool; at least one fluid sampling vessel in fluid communication with the at least one probe through the at least one passageway, wherein the fluid sampling vessel is a rod with annular cutout in which fluid may be isolated when positioned into a bore that serves as a cartridge for handling the fluid; an electric motor-driven hydraulic pump; at least two hydraulic pressure lines; at least one directly controlled actuator; and at least one electrically or hydraulically actuated valve.

Statement 2: The system of Statement 1, wherein the at least two hydraulic pressure lines are disposed in an interlinked series.

Statement 3: The system of Statement 1 or Statement 2, wherein the electric motor-driven hydraulic pump creates a hydraulic pressure communicated to designated hydraulic pressure lines via solenoid valves.

Statement 4: The system of any of the previous Statements, wherein the number of electrically or hydraulically actuated valves is larger than the number of directly controlled actuators.

Statement 5: The system of any of the previous Statements, wherein the fluid sampling tool comprises at least 13 fluid sampling vessels.

Statement 6: The system of any of the previous Statements, further comprising a primary bus connected to the electric motor-driven hydraulic pump through a solenoid valve.

Statement 7: The system of any of the previous Statements, further comprising a primary bus and a secondary bus connected to the electric motor-driven hydraulic pump through two solenoid valves.

Statement 8: The system of any of the previous Statements, further comprising a primary bus and a secondary bus connected to the electric motor-driven hydraulic pump through two solenoid valves, wherein at least one of the solenoid valves is connected to a compensated oil line through a return line.

Statement 9: The system of any of the previous Statements, further comprising a primary bus and a secondary bus connected to the electric motor-driven hydraulic pump through two solenoid valves, wherein at least one of the solenoid valves is connected to a compensated oil line through a return line, wherein the compensation is achieved through a system that communicates external pressure through a vent to internal oil pressure through a piston.

Statement 10: The system of any of the previous Statements, further comprising at least one manual valve on a bus after the least one fluid sampling vessel.

Statement 11: The system of any of the previous Statements, wherein the fluid sampling vessel further comprises a latching mechanism to retain its position after actuation.

Statement 12: The system of any of the previous Statements, wherein the hydraulically actuated valve further comprises a latching mechanism to retain its position after actuation.

Statement 13: The system of any of the previous Statements, further comprising a singular bus.

Statement 14: The system of any of the previous Statements, further comprising an accumulator to hold positive hydraulic pressure and another accumulator to hold negative pressure.

Statement 15: The system of any of the previous Statements, further comprising an accumulator to hold positive hydraulic pressure, another accumulator to hold negative pressure, and at least two check valves.

Statement 16: The system of any of the previous Statements, further comprising a pressure relief valve.

Statement 17: The system of any of the previous Statements, wherein the at least one hydraulically actuated valve is embodied at two-pilot valves with a pilot to open and a pilot to close.

Statement 18: A method of collecting downhole fluid samples comprising: disposing a fluid sampling tool in a wellbore; establishing fluid communication between a formation and the fluid sampling tool through a fluid passageway; establishing fluid communication between the fluid passageway and a fluid sampling vessel, wherein the fluid sampling vessel is a rod with annular cutout in which fluid may be isolated when positioned into a bore that serves as a cartridge for handling the fluid; and actuating a valve to isolate the fluid inside the cartridge from the fluid passageway.

Statement 19: The method of statement 18, further the fluid sampling tool comprises at least two hydraulic pressure lines disposed in an interlinked series to collect at least 6 downhole fluid samples.

Statement 20: The method of statement 18, wherein the fluid sampling tool comprises at least two hydraulic pressure lines, at least two electrically or hydraulically actuated valves, at least one directly controlled actuator, wherein the number of electrically or hydraulically actuated valves is larger than the number of directly controlled actuators.

The preceding description provides various examples of the systems and methods of use disclosed herein which may contain different method steps and alternative combinations of components. It should be understood that, although individual examples may be discussed herein, the present disclosure covers all combinations of the disclosed examples, including, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the elements that it introduces.

For the sake of brevity, only certain ranges are explicitly disclosed herein. However, ranges from any lower limit may be combined with any upper limit to recite a range not explicitly recited, as well as ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A system comprising a fluid sampling tool comprising:

at least one probe in fluid communication with a formation;

at least one passageway that passes through the at least one probe and into the fluid sampling tool;

at least two fluid sampling vessels in fluid communication with the at least one passageway;

at least two valves controlling the fluid communication between the at least two fluid sampling vessels by way of hydraulic valve and the at least one passageway; and at least one actuator that controls the at least two valves, wherein a number of the at least two valves is larger than a number of the at least one actuator.

2. The system of claim 1, further comprising at least four or more fluid sampling vessels in fluid communication with the at least one passageway, and at least three or less valves, wherein one valve controls the fluid communication with one of the at least four or more fluid sampling vessels.

3. The system of claim 1, wherein the fluid sampling tool further comprises at least two hydraulic pressure lines disposed in an interlinked series connected to the at least two valves.

4. The system of claim 1, wherein an electric motor-driven hydraulic pump creates a hydraulic pressure communicated to designated hydraulic pressure lines via the at least two valves.

5. The system of claim 1, wherein the at least two valves are electrically or hydraulically actuated valves.

6. The system of claim 1, wherein the fluid sampling tool comprises at least 13 fluid sampling vessels.

7. The system of claim 1, further comprising a primary bus connected to an electric motor-driven hydraulic pump through one of the at least two valves.

8. The system of claim 1, further comprising a primary bus and a secondary bus connected to an electric motor-driven hydraulic pump through the at least two valves.

9. The system of claim 1, further comprising a primary bus and a secondary bus connected to an electric motor-driven hydraulic pump through the at least two valves, wherein at least one of the at least two valves is connected to a compensated oil line through a return line.

10. The system of claim 1, further comprising a primary bus and a secondary bus connected to an electric motor-driven hydraulic pump through the at least two valves, wherein at least one of the two valves is connected to a compensated oil line through a return line, wherein the compensation is achieved through a system that communicates external pressure through a vent to internal oil pressure through a piston.

11. The system of claim 1, further comprising at least one manual valve on a bus after the at least two fluid sampling vessels.

12. The system of claim 1, wherein at least one of the at least two fluid sampling vessels further comprises a latching mechanism to retain its position after actuation.

13. The system of claim 1, further comprising a singular bus connected to the at least two valves.

14. The system of claim 1, further comprising an accumulator connected to one of the at least two valves to hold positive hydraulic pressure and another accumulator connected to another of the at least two valves to hold negative pressure.

15. The system of claim 1, further comprising an accumulator to hold positive hydraulic pressure, another accumulator to hold negative pressure, and at least two check valves connected to the at least one passageway.

16. The system of claim 1, further comprising a pressure relief valve connected to the at least two valves.

17. The system of claim 1, wherein the at least two valves comprise two-pilot valves with a pilot to open and a pilot to close.

* * * * *